United States Patent
Markel

(10) Patent No.: US 7,542,934 B2
(45) Date of Patent: Jun. 2, 2009

(54) SYSTEM AND METHOD FOR ANALYZING A WAVEFORM TO DETECT SPECIFIED PATTERNS

(75) Inventor: Steven O. Markel, Highlands Ranch, CO (US)

(73) Assignee: Omnicharts, LLC, Highlands Ranch, CO (US)

( * ) Notice: Subject to any disclaimer, the term of this patent is extended or adjusted under 35 U.S.C. 154(b) by 564 days.

(21) Appl. No.: 11/129,564

(22) Filed: May 13, 2005

(65) Prior Publication Data

US 2005/0256703 A1 Nov. 17, 2005

Related U.S. Application Data

(60) Provisional application No. 60/571,110, filed on May 14, 2004.

(51) Int. Cl.
G06F 17/30 (2006.01)
G06Q 40/00 (2006.01)

(52) U.S. Cl. ................... 705/35; 705/10; 705/36 R; 705/37

(58) Field of Classification Search ............ 705/10, 705/35, 36 R, 37
See application file for complete search history.

(56) References Cited

U.S. PATENT DOCUMENTS

| | | | |
|---|---|---|---|
| 6,801,201 B2 * | 10/2004 | Escher | 705/36 R |
| 6,907,404 B1 * | 6/2005 | Li | 705/36 R |
| 7,043,449 B1 * | 5/2006 | Li et al. | 705/36 R |
| 7,149,716 B2 * | 12/2006 | Gatto | 705/36 R |
| 2003/0110124 A1 * | 6/2003 | Escher | 705/38 |
| 2003/0139957 A1 * | 7/2003 | Satchwell | 705/7 |
| 2003/0139989 A1 * | 7/2003 | Churquina | 705/35 |
| 2004/0133500 A1 * | 7/2004 | Thompson et al. | 705/37 |
| 2005/0187854 A1 * | 8/2005 | Cutler et al. | 705/37 |
| 2006/0059072 A1 * | 3/2006 | Boglaev | 705/35 |
| 2006/0080227 A1 * | 4/2006 | Boglaev | 705/37 |
| 2007/0050274 A1 * | 3/2007 | Rogatz | 705/35 |
| 2007/0156570 A1 * | 7/2007 | Singer et al. | 705/37 |
| 2007/0162365 A1 * | 7/2007 | Weinreb | 705/35 |

FOREIGN PATENT DOCUMENTS

EP 03813419 A2 * 1/1989

OTHER PUBLICATIONS

Wall Street, California; Street Strategies; How Pro Traders Use Charts to Hunt for 'Breakout' Stocks; [Home Edition] Walter Hamilton. Los Angeles Times. Los Angeles, Calif.: Mar. 21, 2000.*

(Continued)

*Primary Examiner*—Daniel S Felten
*Assistant Examiner*—William E Rankins
(74) *Attorney, Agent, or Firm*—William W. Cochran; Cochran Freund & Young LLC

(57) ABSTRACT

Disclosed are techniques for analyzing waveforms to determine the existence of certain patterns in those waveforms. The existence of certain patterns can be used by investors to make decisions regarding the purchase or sale of stocks. The processes include a determination of the formation of a base, whether the pattern formed in the base is a cup or saucer, whether there is a double bottom in the base, if a base has broken out and if a handle exists on a cup, as well as other patterns.

14 Claims, 17 Drawing Sheets

OTHER PUBLICATIONS

Vancouver's Teresa Lo picks her way into stocks pantheon: Knowing 'the only two things that cannot lie' her ticket to top; [Final Edition] Harvey Enchin. The Vancouver Sun. Vancouver, B.C.: Jan. 19, 2002.*

Wall Street, California; Street Strategies; How Pro Traders Use Charts to Hunt for'Breakout' Stocks; [Home Edition] Walter Hamilton. Los Angeles Times. Los Angeles, Calif.: Mar. 21, 2000.*

One investor's technical analysis is another person's tea-leaf reading Paul J. Lim. U.S. News & World Report. Washington: Jun. 19, 2000. vol. 128, Iss. 24.*

Bottoms up? ; If you're wondering which way stock prices are headed, some funny shapes may offer a clue Paul J. Lim. U.S. News & World Report. Washington: Dec. 3, 2001.*

* cited by examiner

SYSTEM AND METHOD FOR ANALYZING A WAVEFORM TO DETECT SPECIFIED PATTERNS

CROSS REFERENCE TO RELATED APPLICATIONS

The present application claims priority to and benefit of U.S. Provisional Application Ser. No. 60/571,110 filed May 14, 2004 by Steven O. Markel entitled "System and Method for Determining Potential Buying and Selling Patterns in Historical Stock Price and Volume Data", the entire contents of which are hereby specifically incorporated by reference for all it discloses and teaches.

BACKGROUND OF THE INVENTION a. Field of the Invention

The present invention pertains generally to analysis of waveforms and more particularly to analysis of historical stock price and volume data waveforms to detect specified patterns.

b. Description of the Background

Technical analysis of stock involves analyzing historical price and volume data for stocks and looking for trends that are evolving. These trends may be used as a tool to help predict buying and selling opportunities of stocks and other financial instruments.

There are many different "technical indicators" that investors use. Most of these are mathematical or statistical functions of the data. For example, along with plotting the price and volume of the stock on a daily chart, a 50-day moving average trend line can be plotted that shows the average price of a stock on any particular day based on the previous 50 days.

Particular patterns can indicate trends in the stock. Recognition of these patterns has been found to be difficult and time consuming.

SUMMARY OF THE INVENTION

The present invention overcomes the disadvantages and limitations of the prior art by providing a system and method for analyzing waveforms to detect specified patterns.

The present invention may therefore comprise a method of analyzing a waveform of a stock to detect specified patterns using a computer system comprising: providing a data record array to the computer system that includes selling price and volume of the stock; providing constants relating to a definition of the specified patterns; analyzing the data record array to determine if a base has formed that has a top of base value and a bottom of base value that are separated by a specified amount and a temporal length greater than a minimum base length; analyzing the data record array to determine the existence of specified patterns in the base; analyzing the data record array to determine the existence of specified patterns that are attached to the base; displaying the specified patterns in the base and the specified patterns attached to the base.

The present invention may further comprise a computer system that is programmed to perform a method of analyzing a waveform of a stock to detect specified patterns comprising: providing a data record array to the computer system that includes selling price and volume of the stock; providing constants relating to a definition of the specified patterns; analyzing the data record array to determine if a base has formed that has a top of base value and a bottom of base value that are separated by a specified amount and a temporal length greater than a minimum base length; analyzing the data record array to determine the existence of specified patterns in the base; analyzing the data record array to determine the existence of specified patterns that are attached to the base; displaying the specified patterns in the base and the specified patterns attached to the base.

The present invention may further comprise a storage medium that can be used to program a computer system to perform a method of analyzing a waveform of a stock to detect specified patterns comprising: providing a data record array to the computer system that includes selling price and volume of the stock; providing constants relating to a definition of the specified patterns; analyzing the data record array to determine if a base has formed that has a top of base value and a bottom of base value that are separated by a specified amount and a temporal length greater than a minimum base length; analyzing the data record array to determine the existence of specified patterns in the base; analyzing the data record array to determine the existence of specified patterns that are attached to the base; displaying the specified patterns in the base and the specified patterns attached to the base.

DETAILED DESCRIPTION OF VARIOUS EMBODIMENTS OF THE INVENTION

Figure 1:
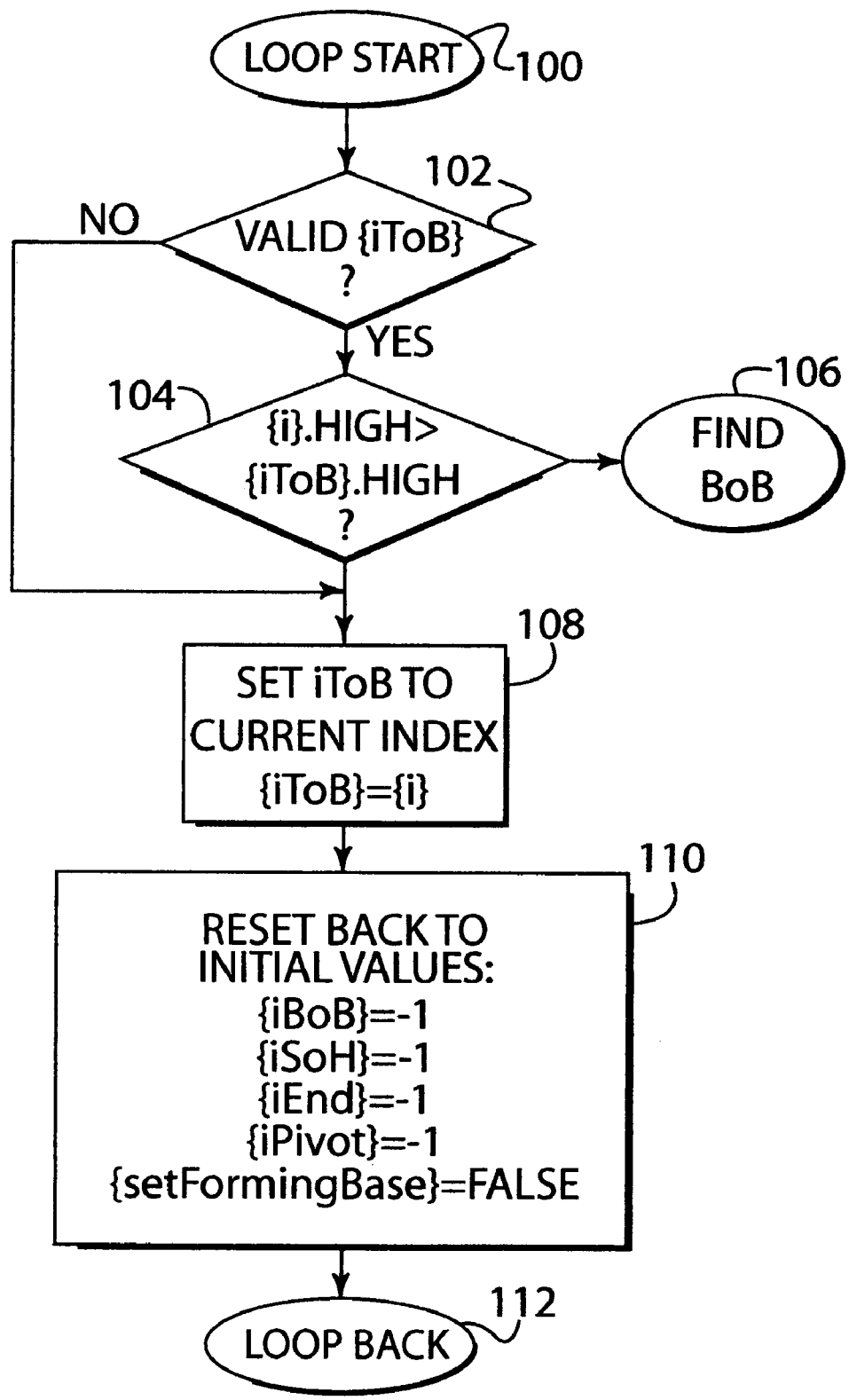
FIG. 1 is a flow diagram illustrating the process for finding the top of a base.

The system and process disclosed employs various techniques for analyzing waveforms to recognize various pattern. A "base" pattern is the basic pattern that is recognized using the various embodiments disclosed herein. A "base" pattern is a fundamental type of stock chart pattern. A base indicates periods when a stock levels off or corrects after having advanced for awhile. The first step is the determination of the bounds of the base pattern. The second step is to determine the type of pattern that exists within the base. Once the type of pattern is recognized, a set of rules can be applied to that pattern to provide more information regarding the specific pattern that has been identified, such as how the pattern ranks with regard to an ideal pattern. This ranking information can then be displayed for use by a user of the system.

The various types of patterns, as well as terminology used in this application, with respect to analysis of waveforms generated from historical data of stock price and volume, is disclosed at Investor's Business Daily website (www.investors.com) and in the following books: *How to Make Money in Stocks: A Winning System When Good Times Are Bad*, Third Edition, by William J. O'Neill, McGraw-Hill (2002); *The Successful Investor: What Eighty Million People Need to Know to Invest Profitably and Avoid Big Losses;* by William J. O'Neill, McGraw-Hill (2003); *Twenty Four Essential Lessons for Investing Success: Learn the Most Important Investment Techniques from the Founder of Investor's Business Daily*, by William J. O'Neill, McGraw-Hill (1999).

Historical data regarding stock price and volume can be obtained from various sources and in various formats. The data for any particular stock comprises information relating to the opening price, the high price, the low price, the closing price, the adjusted closing price, the volume for each day and average volume. The adjusted closing price can take into account stock splits, dividends and other information. These data files are available from various sources including Yahoo!, Commodity Systems, Inc. (www.csidata.com), and EODData (www.eoddata.com). In the present instance, data for at least one year is obtained for each stock which comprises approximately 250 records. In addition, information such as 50-day moving average volume can be obtained and included in the data records.

Once the historical data for a stock has been obtained, either from a data base, flat file, web request or other source, the analysis of the data can begin. As indicated above, the data is placed into an array with each record containing the day's adjusted opening, closing, high and low prices, along with the volume of shares traded for that day.

The initial module of the system is the "setup and initialization" module. The setup and initialization phase defines constants as well as clearing and initializing variables to initial or default values, as indicated below. The constants and variables remain fixed for the various routines specified herein. Identification of the constants and how they are used is given in Table 1.

TABLE 1

| Constants. | | |
|---|---|---|
| Constant | Value | How Used |
| minBaseLength | 7 | Minimum base length (in weeks) used in determining whether a valid base has formed, and also whether a valid correction can be calculated [450]. |
| maxSaucerBaseCorrection | 15 | The maximum percentage correction for a saucer pattern base correction. The value is checked at [560] to determine if a base has a saucer pattern. |

Table 2 is a listing of the startup variables and a description of those variables.

TABLE 2

| Variables. | | | |
|---|---|---|---|
| Variable | Type | Value | Description |
| Hist | Array of strings The historical pricing records array is a memory resident array of strings. | Set of string records | Historical pricing records array Each record consists of comma separated values in a fixed sequence that does not vary record to record. The values represent the date (date), opening price (open), high price for the day (high), low price for the day (low), closing price (close), the number of shares traded that day (volume) and the 50-day moving average volume (average volume). More information about this variable is described below. |
| I | Integer | 0 | Index, zero based, into the historical pricing record array. The initial value of zero indicates that i is referring to the first record of the historical pricing records array |
| iToB | Integer | −1 | Zero based index into the specific record of the historical pricing record array that contains the top of base (ToB) information. This single record contains the date, open, high, low, |

TABLE 2-continued

Variables.

| Variable | Type | Value | Description |
|---|---|---|---|
| | | | close, volume and average volume for a specific day. A value of −1 will be referred to as a "non-valid" or invalid top of base. All other iXXX variables use this same syntax where −1 indicates an invalid or 'not-set-yet' value. For purposes of this document, the reference iToB.high, for example, indicates the high price from the specific historical pricing record array record. For example, consider a record of the historical pricing records array that contains the string value of "8/22/2004, 23.41, 27.58, 22.75, 27.25, 108700, 78700". The record would indicate for a date of Aug. 22, 2004, the open price was 23.41, high price of the day was 27.58 with the intraday low being 22.75 and the closing price of 27.25. The volume for that day was 108,700 shares and the average volume was 78,700 shares. A reference to iToB.high would refer to the high field or 27.58. |
| ToB | Decimal | 0.00 | The top of base value |
| iBoB | Integer | −1 | Zero based index into the specific record of the historical pricing record array that contains the bottom of base (BoB) information. |
| BoB | Decimal | 0.00 | Bottom of base value |
| iSoH | Integer | −1 | Zero based index into the specific record of the historical pricing record array that contains the start of handle (SoH) information. |
| formingHandle | Boolean | False | Flag indicating whether or not the base is forming a handle. |
| validHandle | Boolean | False | Flag indicating whether or not the base has a valid handle. |
| iBreakout | Integer | −1 | Zero based index into the specific record of the historical pricing record array that contains the breakout information [365]. |
| iPivot | Integer | −1 | Zero based index into the specific record of the historical pricing record array that contains the pivot information. |
| Pivot | Decimal | 0.0 | Pivot value |
| iEnd | Integer | −1 | Zero based index into the specific record of the historical pricing record array represents the end of the base under study. |
| completeBaseDefinition | Boolean | False | Flag indicating whether or not the base has a complete definition. |
| formingBase | Boolean | False | Flag indicating whether or not a base is forming. |

TABLE 2-continued

Variables.

| Variable | Type | Value | Description |
|---|---|---|---|
| readyToBreakOut | Boolean | False | Flag indicating whether or not the base is ready to break out. |
| ePtn | enum | none | Enumerated value representing a base patter. Possible choices include: |
| baseLen | Integer | 0 | Length, in integer weeks, of the base. For example, if a calculation resulted in 9.7 weeks, the integer result would be 10 weeks. |
| eBOType | enum | noBreakout | Enumerated value representing a type of breakout. |
| baseCorr | Integer | 0 | The percentage correction of the base, expressed as an integer. See the flowchart 'Calculate Base Correction' starting at [400]for how this variable is set. |
| iToDB | Integer | −1 | Zero based index into the specific record of the historical pricing record array that represents the top of a double bottom pattern |
| iBoDB | Integer | −1 | Zero based index into the specific record of the historical pricing record array that represents the bottom of a double bottom pattern |

Table 3 is a listing of various patterns and various breakout types.

TABLE 3

Enumerations.

| Enumeration | Elements | Description |
|---|---|---|
| eBOTypes | noBreakout<br>boGE20pc: broke out >= 20%<br>boLT20pc: broke out < 20%<br>boITZ: broke out, but still 'in the zone'<br>'In the zone' refers to a stock that broke out, but within 48 hours of breaking out, is still within −2.5% and +5% of the calculated pivot point.<br>boFailure: broke oiut, but fell below −2.5% from pivot. | List of possible breakout types |
| ePtns | none: no base is forming<br>iCwH: ideal cup with handle<br>CwH: cup with handle<br>CwoH: cup without handle<br>DBwH: double bottom with handle<br>DBwoH: double bottom without handle<br>SwH: saucer with handle<br>SwoH: saucer without handle<br>eB: etching base | List of possible patterns [490], [ . . . ] |

As indicated above, the input data is an array of records of historical price and volume information for each stock from which patterns are obtained and analyzed in accordance with the various embodiments disclosed herein. This historical data is the input data that is a collection of identically formatted records that are assorted in ascending date from the earliest dates to the latest dates. Each record includes values for each day including the date, the opening price, the high price, the low price and the closing price. The data is separated by commas in a standard format such as shown in Table 4. Other fields can also be calculated using standard mathematical techniques. Typically, the input data is stored as either a database table or a resident structure in memory, such as a dataset. A sample segment is shown in Table 4.

TABLE 4

Sample Input Data.

| Index | Record |
|---|---|
| 0 | "8/23/2004, 23.41, 27.58, 22.75, 27.25, 108700, 78700" |
| 1 | "8/24/2004, 27.29, 27.37, 26.25, 26.37, 97800, 82000" |
| 2 | "8/25/2004, 26.30, 26.35, 25.78, 25.92, 101300, 82700" |
| . . . | . . . |

The data record for Index 1 indicates the following information: Date of this record is Aug. 24, 2004. The opening price for this record (on this date for this stock) is $27.29. The high price on this date for this stock was $27.37. The low price on this date for this stock was $26.25. The closing price was $26.37. The volume of shares traded was 97,800 shares. The 50-day moving average volume was 82,000 shares.

The flow charts disclosed and described herein utilize a syntax that should be understood to understand the functions disclosed in the flow charts. Each of the variables such as {iToB} constitutes index values that reference the sample input data record array. For example, {iToB} does not contain the actual top of the base value, but is the record index number of the historical pricing record array. So, if the variable {iTob}=1, the bracket {iToB} variable refers to the Index 1 data in Table 4. When the variable {iToB} refers to the high value of the stock in a record (on a given day), the syntax {iToB}.high is used. Referring to Table 4 as an example, when {iToB} is 1 and the high value is desired for Index 1 (Aug. 24, 2004), then {iToB}.high is 27.37.

After all the variables are declared and initialized, the setup and initialization phase "finding top of base" procedure is performed as disclosed in FIG. 1. The top of base refers to the top left corner of any base pattern of historical price data of a stock in which prices are plotted from left to right in time sequence. The top of base is initiated at step 100 by providing the high value from the first record of the historical pricing record array of input data, such as shown in Table 4. In other words, the value of 27.58, which is the high value for index record 0 of Table 4 is initially seeded into the process of FIG. 1. The flow chart illustrated in FIG. 1 is a loop that examines each record in the historical pricing array. At step 102, during the first past through the flow chart illustrated in FIG. 1, the {iToB} value is set to −1 and the process proceeds to step 108. In other words, the first time through this loop, the {iToB} is invalid, i.e., is set to −1. The determination of an invalid top of base causes the process to skip to step 108 and set {iToB} to the current index at step 108. The process then proceeds to step 110 to reset the initial values as shown at step 110. The second time through the flow chart illustrated in FIG. 1, decision block 102 determines that there is a valid [iToB] and proceeds to decision block 104. At step 104, the top of base is then compared to the high value stored for the top of base. If the high value stored for the top of base is greater than the current value for the top of base, the process then proceeds to step 108. If it is not, the process proceeds to step 106 to find the bottom of base. Each of the record array indexes is examined in this fashion.

Figure 2:
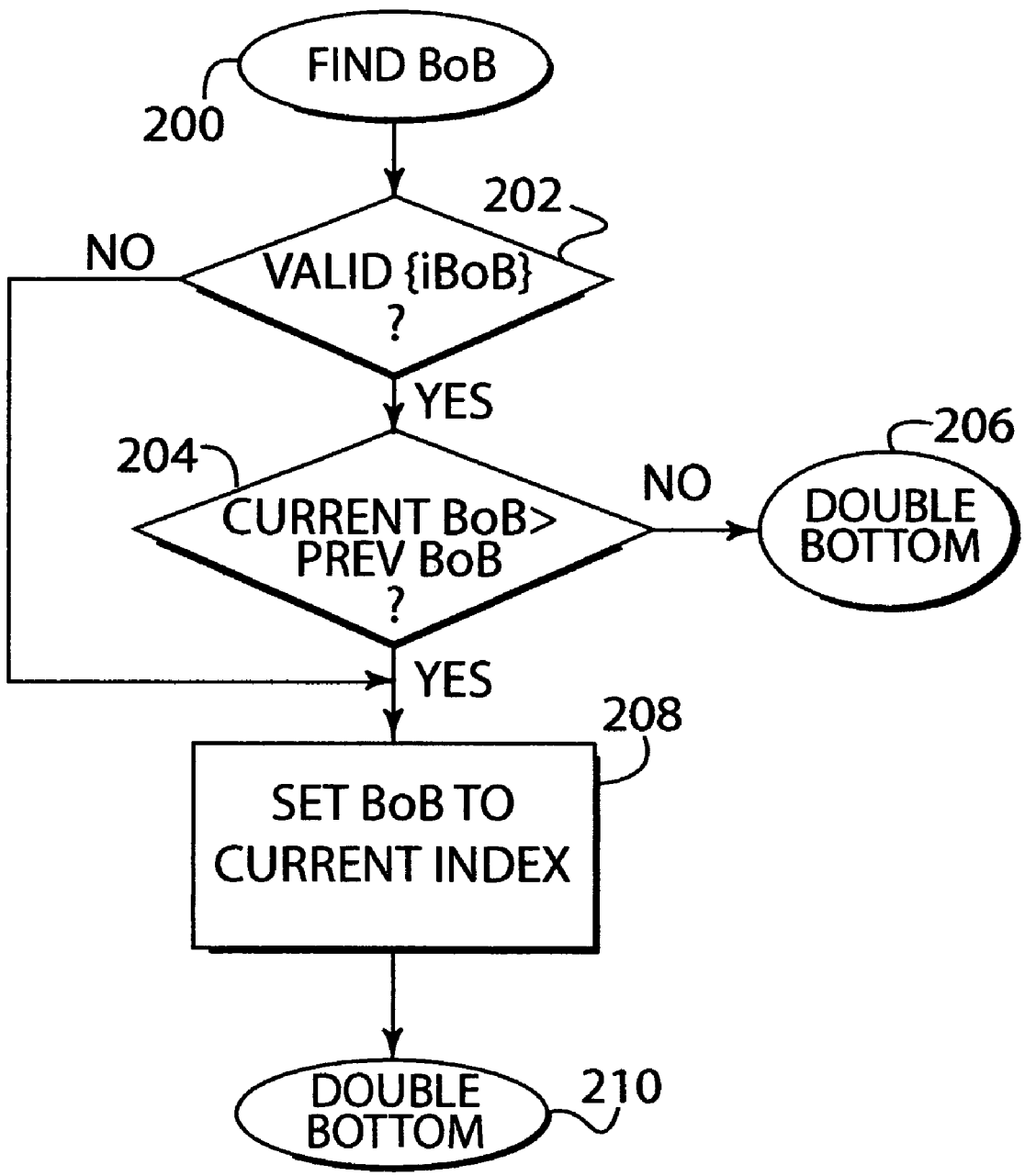
FIG. 2 is a flow diagram illustrating the process for finding the bottom of a base.

Once a tentative top of base has been identified, the process then determines a bottom of base by going through consecutive records starting with the current index from the historical pricing record array and looking at the low values for each record of the historical pricing record array. As shown in FIG. 2, the process illustrated in FIG. 2 extracts the low price value from the historical pricing record array. At step 200, the process of determining a bottom of base is initiated. From the current historical pricing record array index, the low price value is extracted. If there is not yet a valid bottom of base at step 202, then the bottom of base is set to the current value and the process proceeds to step 204. The current bottom of base is then compared to the previous bottom of base and if the current bottom of base is greater than the previous bottom of base, then the process proceeds to step 208. If the current bottom of base is not greater than the previous bottom of base, the process proceeds to step 206 to determine if a double bottom exists. At step 208, the current index is set to the bottom of base and the process proceeds to step 210 to determine if a double bottom is forming. Since both a valid top and bottom of base are now defined, it must be determined if a top and bottom of a double bottom base is forming.

Figure 3:
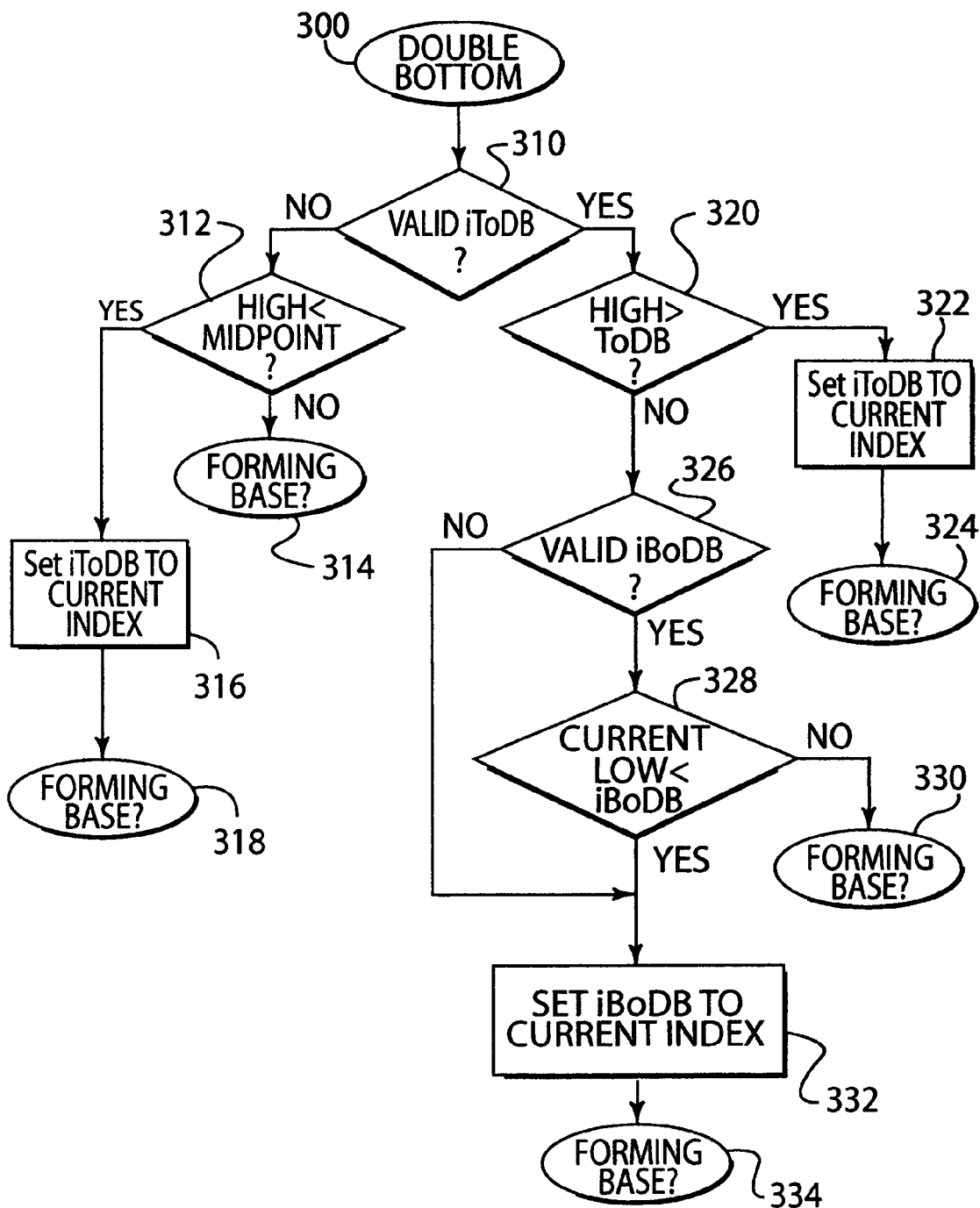
FIG. 3 is a flow diagram illustrating the process for finding the top or bottom of a double bottom pattern.

The process then proceeds to the flow diagram illustrated in FIG. 3. At step 300, the double bottom process is initiated. At step 310, it is determined if the index value of the top of the double bottom variable {iToDB} has already been set to a valid index of the historical pricing record array. If it has not, the index value is set to −1. The process then proceeds to step 312 to determine if the current high price from the current record of the historical pricing record array is in the upper half of the base. To determine if the high values in the upper half of the base, the midpoint between the top and bottom of the base is calculated by adding the high value from the top of the base historical pricing record to the low value of the bottom of the base historical pricing record and dividing by two. This calculation provides a midpoint, and that value is compared to the current value. If the current value is greater than the midpoint, the process proceeds to step 316 to set the index for the top of the double bottom to the current historical pricing record array index and to proceed to the next module at step 318 to determine if a base is forming. If it is determined at step 312 that the high point is not in the upper half of the base, then the process proceeds to the next module at step 314 to determine if a base if forming. At step 320, the process checks to determine if there is an assigned valid index for the top of double bottom. The high value of the record is then checked to determine if it is higher than the existing top of double base. If it is, the high value from the current record replaces the previous value at step 322 and the process proceeds to step 324 to determine if a base is forming. If it is not, the process proceeds to step 326. At step 326, it is determined if a valid index for a bottom of double bottom already exists. If it does not, the current record low value is set as a value for the bottom of the double bottom at step 332, and the process proceeds to step 334 to determine if a base is forming. If it is determined at step 328 that a valid index for a bottom of a double bottom does exist, the process proceeds to step 330 to determine if a base is forming.

Figure 4:
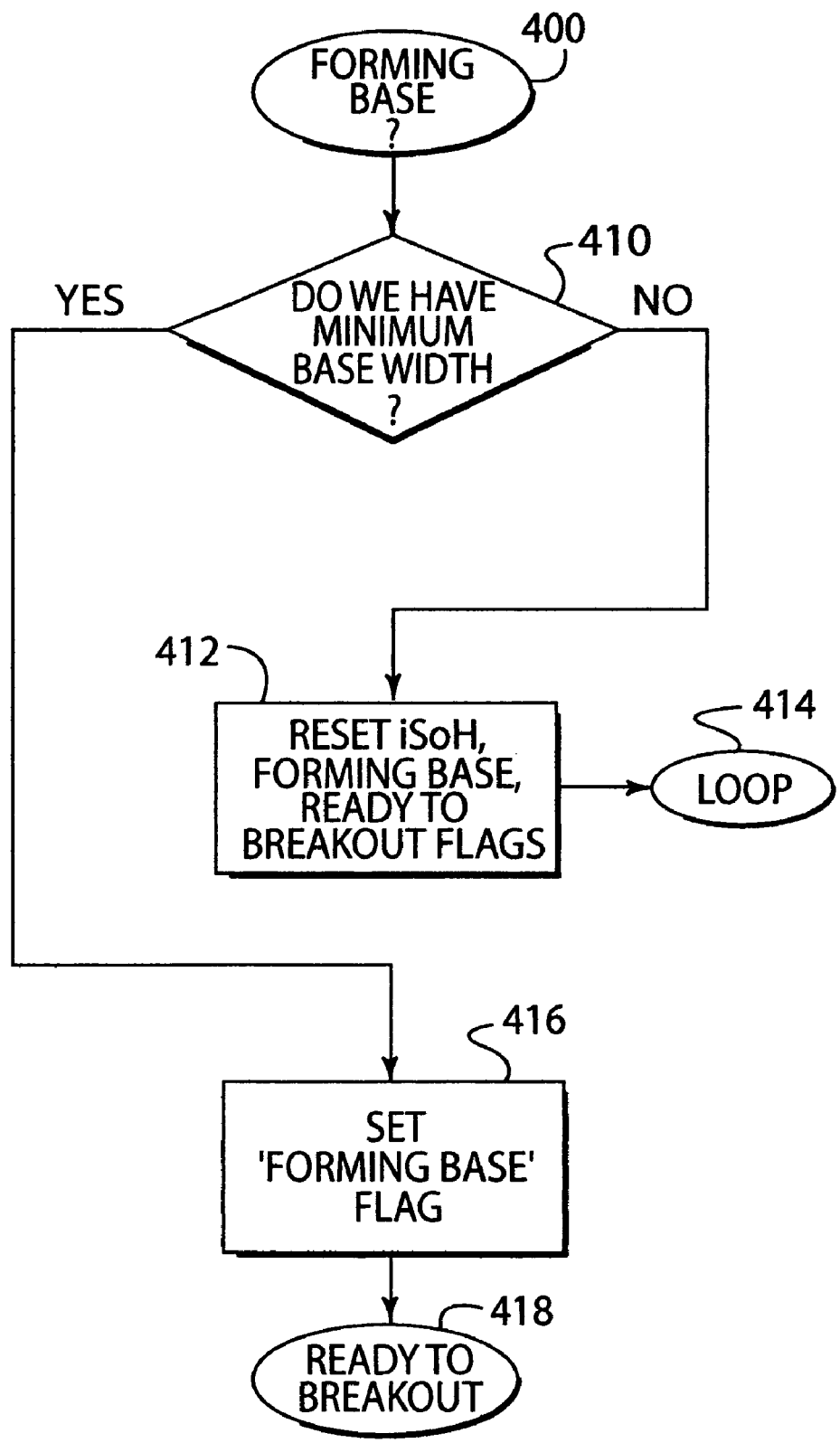
FIG. 4 is a flow diagram illustrating the process of determining whether a base is forming.

FIG. 4 is a flow chart that provides a process for determining if a base is forming. Once a top and bottom of a base have been identified, the process of FIG. 4 is used to determine if a base is actually forming by looking at the elapsed time in days between the top and the bottom of the base. The elapsed time between the top and bottom of the base is calculated by extracting the date from the bottom of base record and extracting the date from the top of base record. These dates are then subtracted to determine the number of days of difference. At step 400, the process of FIG. 4 is initiated. At step 410, the determination of the number of days to create a base is determined. If the difference in the two dates is greater than or equal to 49 days, i.e., seven weeks, then it is determined that a base is forming, and the process proceeds to step 416. The process then proceeds to determine if a breakout is ready to occur. If the number of days is less than 49 days, various flags are reset at step 412. In particular, reset flags include whether a base is forming, whether a breakout is ready and whether there is a start of handle (SoH). At step 414, the process returns to the initial loop (FIG. 1) at step 112.

Figure 5:
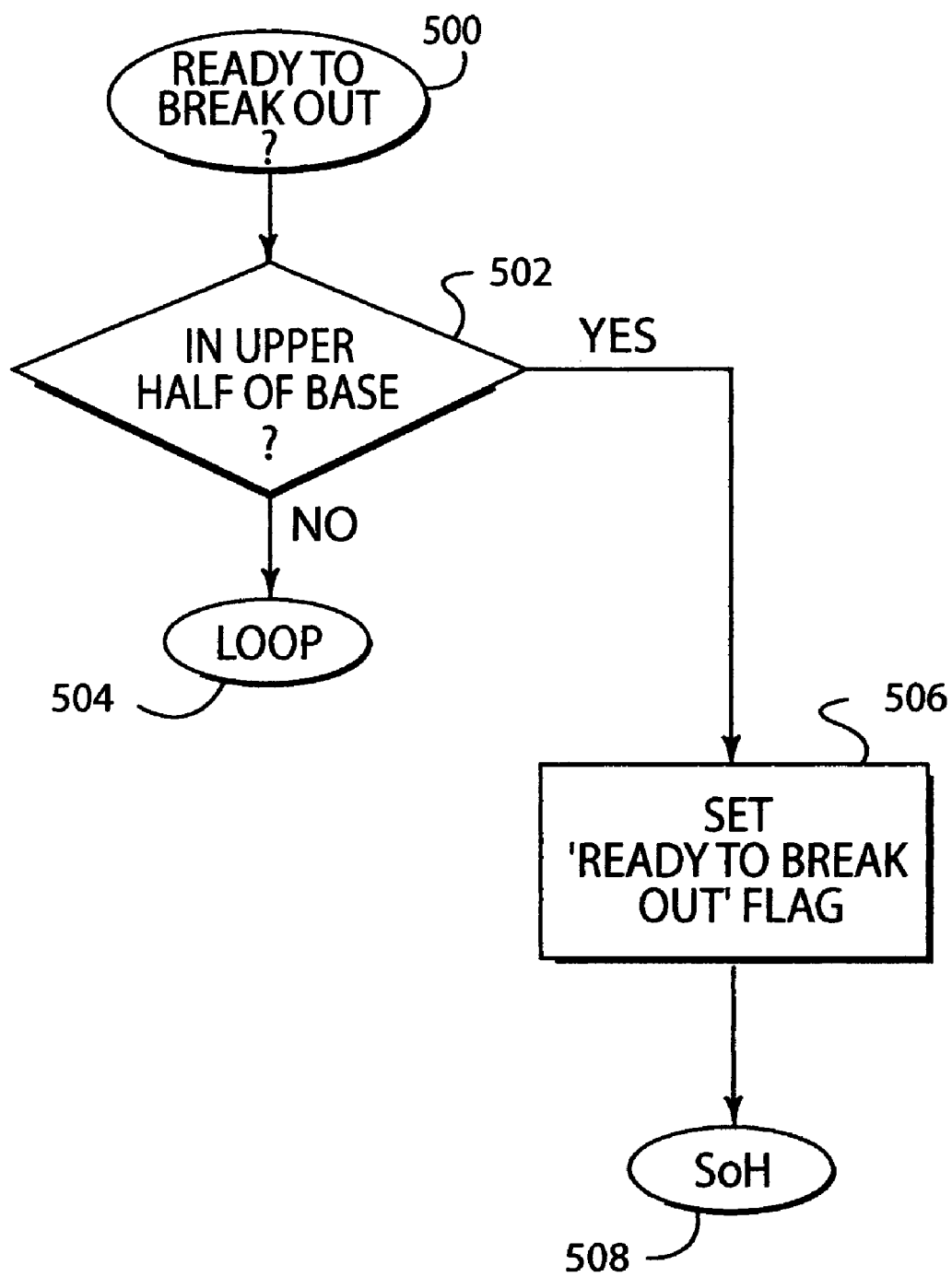
FIG. 5 is a flow diagram illustrating the process of determining whether a base is ready to breakout.

FIG. 5 discloses the process for determining if the base is ready to breakout. As a result of the previous steps, a top and bottom of the base have been identified, and the top and the bottom are sufficiently spaced by a number of days to indicate that a base is forming. If the high value, i.e., the high selling price of a current index of the pricing record array, is in the upper half between the top and the bottom of the base, that is an indication that the base is ready to breakout. As shown in FIG. 5, at step 500, the process for determining if the base is ready to breakout is initiated. At step 502, it is determined whether the high selling price of the current data record is in the upper half of the base. To determine if the high value is in the upper half of the base, the midpoint is calculated between the top and bottom of the base by adding the high value from the top of the base to the low value of the bottom of the base and dividing by two. For example, if the top of the base has a high value of 37 and a low value of the bottom of the base is 19, the midpoint between these is 28. In this example, if the high value of the current historical pricing record is above 28, then the high value of the current historical record is in the upper half of the base and a "ready to breakout" flag is set at step 506. The process then proceeds to step 508 to determine if a start of handle is forming. If the high point is at the midpoint or lower, at step 504, the process returns to step 112 of FIG. 1 to continue looping through the historical pricing record array.

Figure 6:
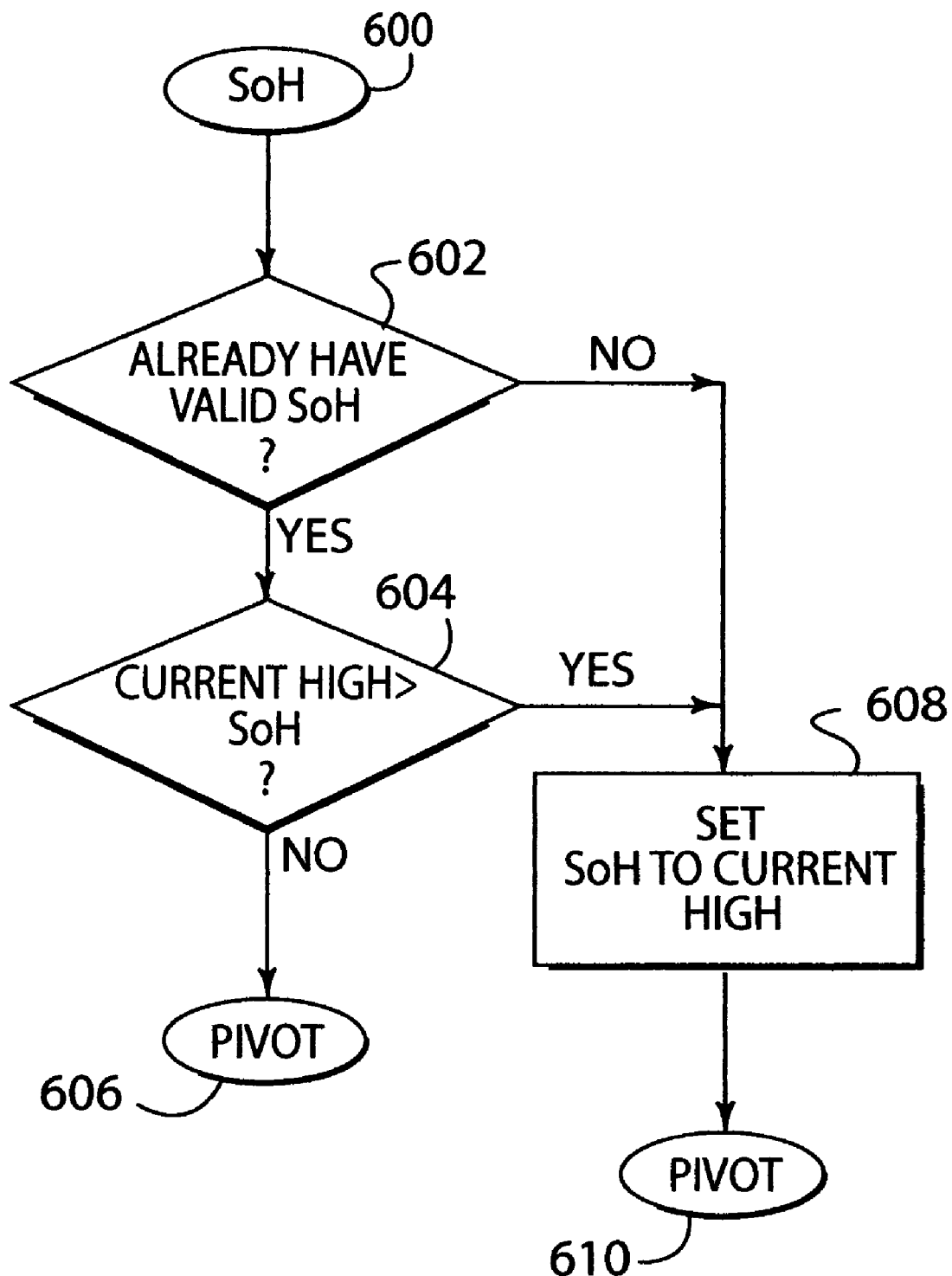
FIG. 6 is a flow diagram illustrating if a handle has started.

FIG. 6 discloses the process for determining the start of a handle (SoH). In previous processes, it has been determined that a base has formed of sufficient length and the current historical pricing record has a high value that is in the upper half of the base. The process disclosed in FIG. 6 determines if a handle (an area on the right side of the base where the price and volume decrease in a small amount for a week or so) has started. At step 600, the start of handle analysis is initiated. A handle must start in the upper half of the base, and a price must be gradually descending over at least 3 days but not more than a week. At step 602, it is determined whether or not a valid start of handle exists. In that regard, the variable [iSoH] is checked to determine its value. If the start of handle variable is set to −1, then a valid start of handle does not yet exist. At step 608, the start of handle variable is set to the current high value in the data record and the process proceeds to step 610 to determine a pivot point. If it is determined at step 602 that a valid start of handle exists, the process proceeds to step 604 where the current high value is compared to the start of handle value. If the current high value is greater than the start of handle value, the process proceeds to step 608. If it is not, the process proceeds to step 606 to determine the pivot point.

Figure 7:
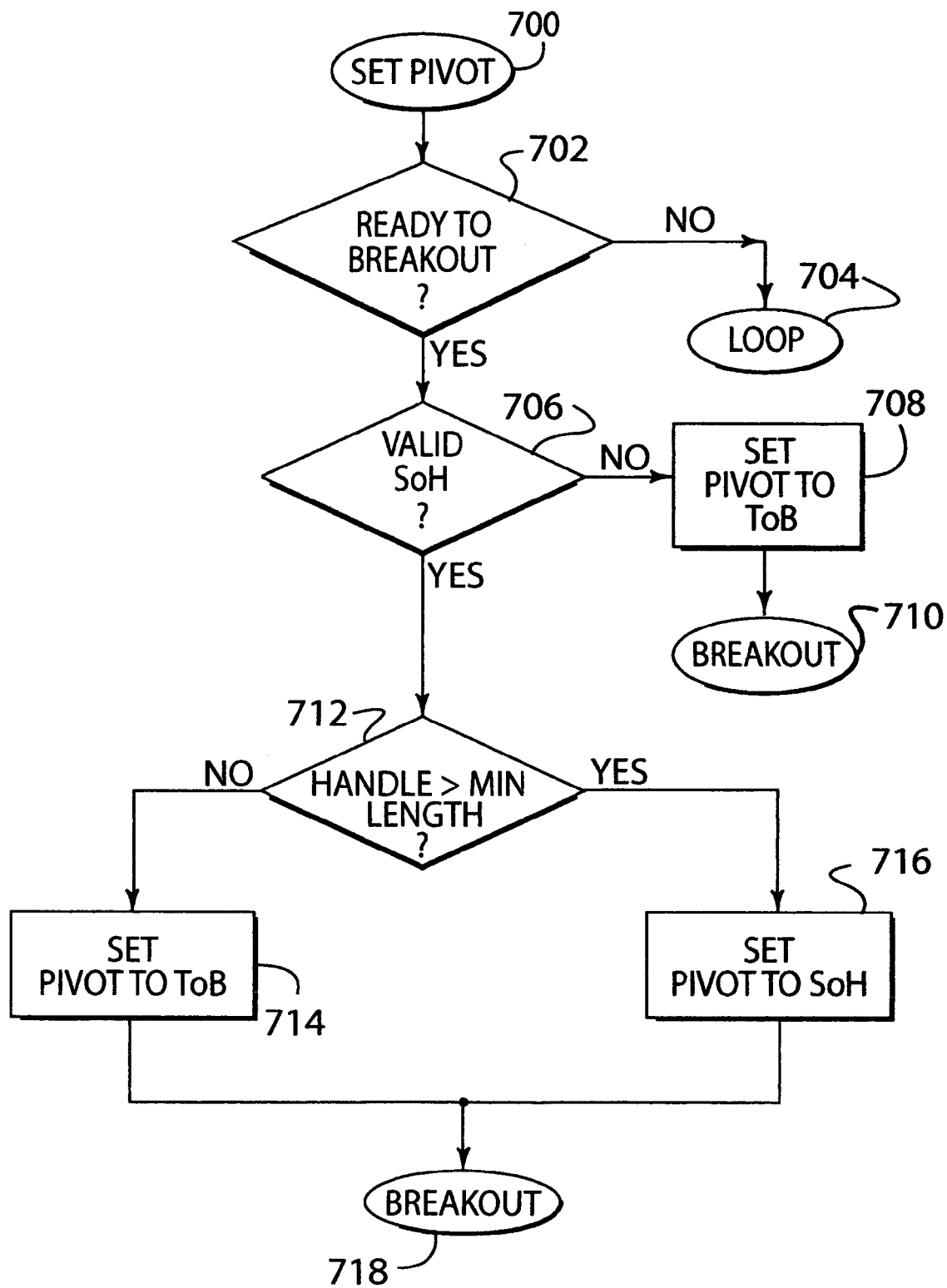
FIG. 7 is a flow diagram illustrating the manner of calculating pivot points.

FIG. 7 is a process used to determine pivot points. Pivot points are calculated prices that reflect the point at which a base may breakout. The process for determining pivot points begins at step 700. To determine the pivot points, it is necessary to examine the flag "ready to breakout" that is set at step 506 of FIG. 5 and how this flag is set. If the flag is false, as determined at step 702, the process proceeds at step 704 to step 112 of FIG. 1. In this instance, the base is not yet ready to breakout and pivot points are meaningless in this situation. If the flag "ready to breakout" is true, the software checks to see if there is a valid start of handle at step 706. If the base does not have a handle, the pivot is calculated by using the top of base at step 708. The process then proceeds to check if a breakout has already occurred at step 710. If there is a valid handle, it is determined if the handle has a sufficient length at step 712. A minimum length is generally about three days. If the handle has about this length, the pivot is set at the start of handle at step 712, and then the process proceeds to step 718 to determine if a breakout has occurred. If the handle does not meet the minimum length, the process proceeds to step 714 to set the pivot point at the top of base value. The process then proceeds to step 718 to determine if a breakout has occurred.

Figure 8:
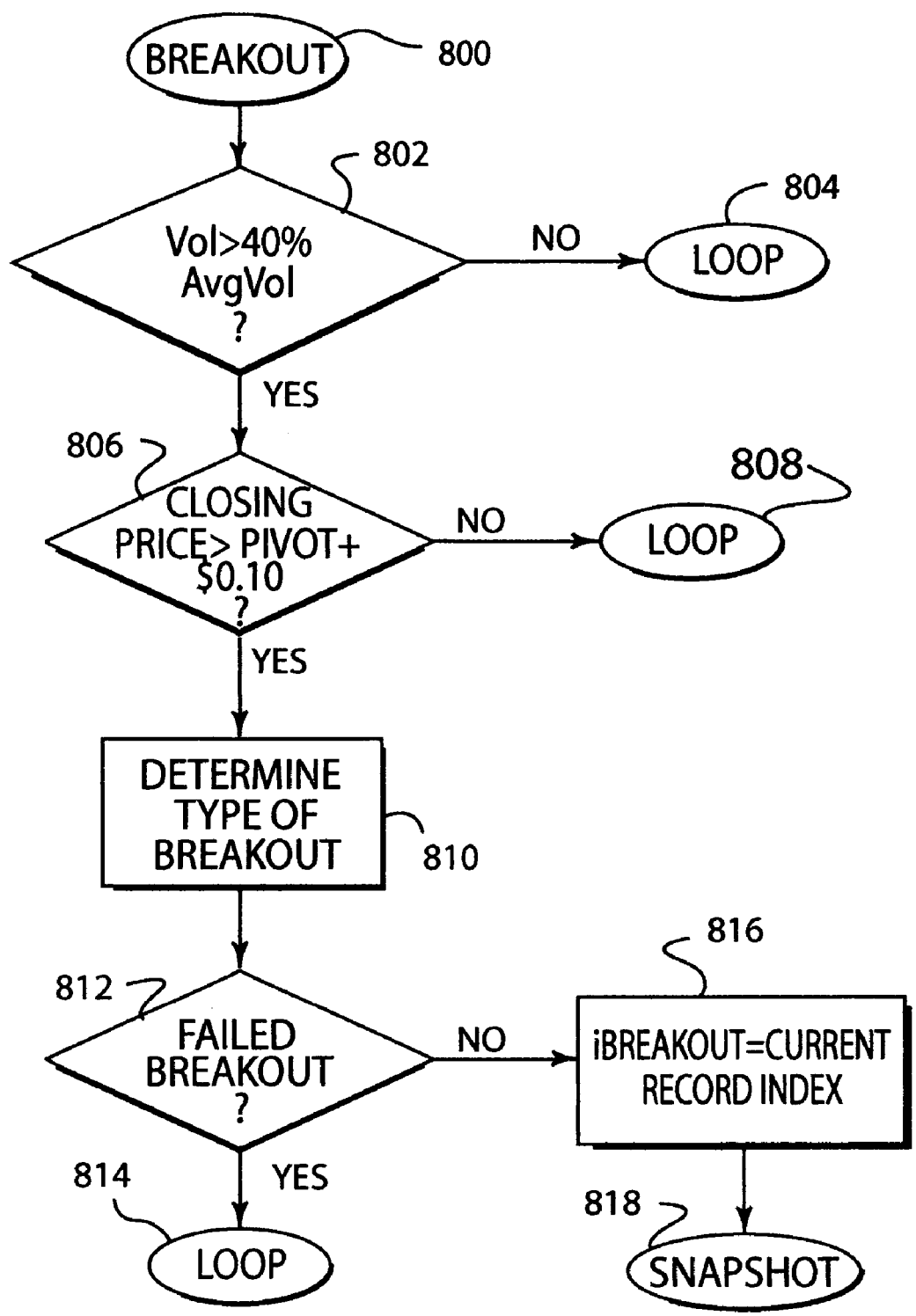
FIG. 8 is a flow diagram illustrating the process for checking for a possible breakout.

FIG. 8 discloses the process for checking for a possible breakout. The previous processes have indicated that the base is ready to breakout. The process disclosed in FIG. 8 determines if the base has broken out by looking at the characteristics of a breakout including high volume and the price exceeding the calculated pivot point. If the base has had a successful breakout, the variable iBreakout is set to the index of the current historical pricing record array. The process for determining a possible breakout is initiated at step 800. A breakout occurs when the daily volume is at least approximately 40 percent above the average volume which is calculated on a 50-day moving average, and the closing price for that day is at least 10 cents above the calculated pivot price as determined at step 802. If the volume is not greater than 40 percent of the average volume, the process proceeds to step 804 and loops back to step 112 of FIG. 1. If the volume is greater than 40 percent of the average volume, the process proceeds to step 806. At step 806, it is determined whether the closing price is greater than the pivot point plus 10 cents. If it is not, the process proceeds to step 808 and returns to loop back at step 112 at FIG. 1. If it does, the process proceeds to step 810 to determine the type of breakout. At step 810, a process is run to determine the type of breakout that has occurred and the different actions to be taken as a result of the type of breakout. The type of breakout possibilities and resultant actions include:

1. A Successful Breakout Greater than 20 Percent. This condition occurs when a stock breaks out of its base and goes to or beyond 20 percent greater than the calculated pivot point. When this occurs, the process proceeds to step 816 and then the iBreakout variable of the current index of the historical pricing record array can take a "snapshot" of the base characteristics.

2. A Successful Breakout Less Than 20 Percent. This occurs when a stock breaks out of its phase, but the breakout did not exceed 20 percent of the calculated pivot point. The iBreakout variable is then set, at step 816, to the current record index of the historical pricing record array, and a "snapshot" of the base characteristics is taken.

3. A Failed Breakout. This occurs when a stock broke out of its base, but fell back below the calculated pivot point. The process then proceeds to step 814 and proceeds to the loop-back step 112 of FIG. 1.

4. In the Zone. This occurs when it is determined that, within 48 hours of breaking out, the stock is within plus 5 percent and minus 2.5 percent of the calculated pivot point. In this instance, the iBreakout variable is set to the current index of the historical pricing record array and a snapshot of the base characteristics is taken at step 818.

Figure 9:
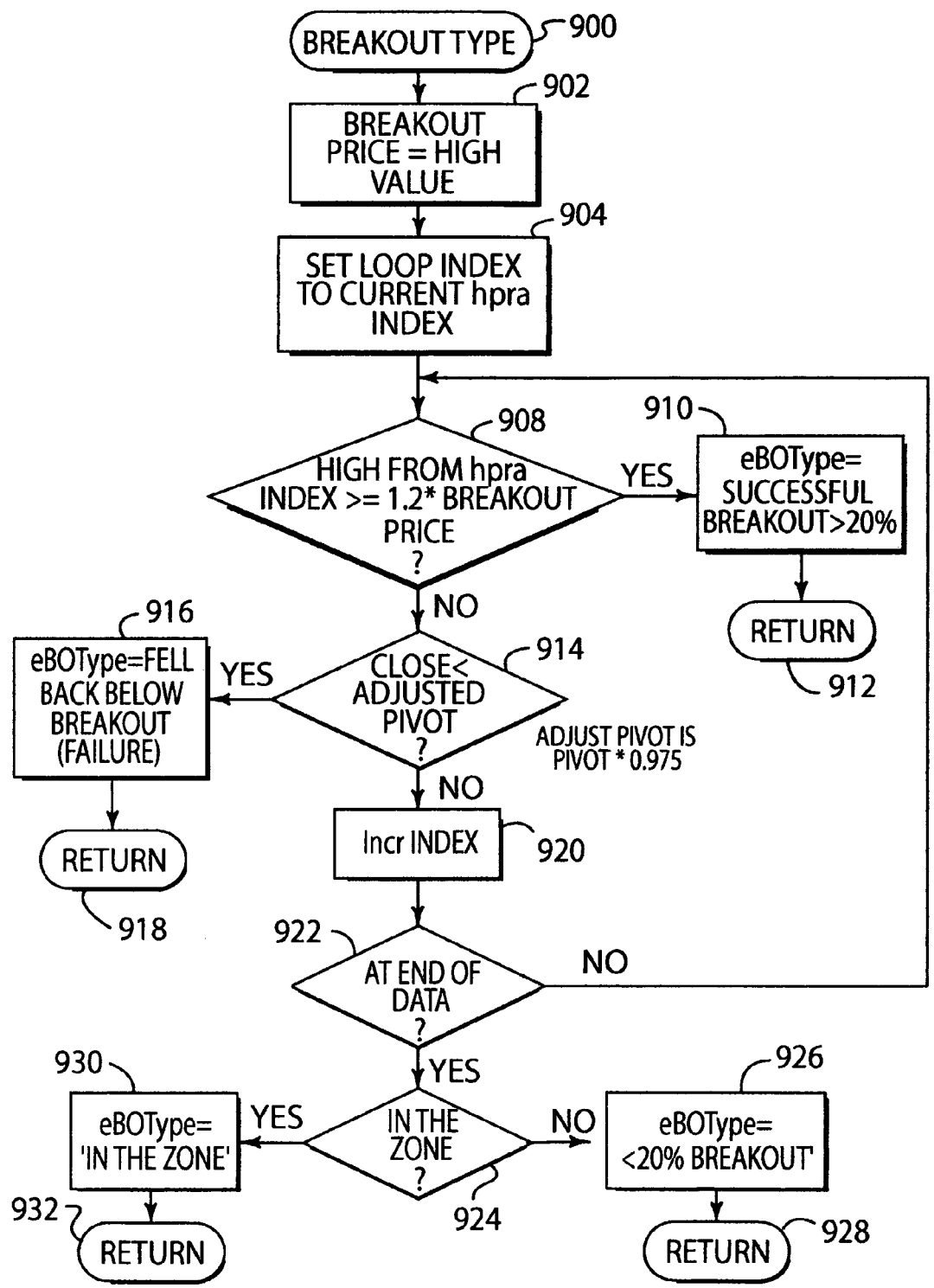
FIG. 9 is a flow diagram illustrating the process of determining the type of breakout.

FIG. 9 discloses the process for determining the type of breakout. The process illustrated in FIG. 1 starts at step 900 after it has been determined that the stock has broken out of its base according to the rules set forth in a previous module. The process illustrated in FIG. 9 checks for one of n possible breakout scenario, as defined by the enumerated breakout type (eBOType) that is disclosed in Table 3, and sets the variable eBOType. At step 902, the module saves the high value from the current record of the historical pricing record array. At step 904, the index of the current record is set. The process then loops through the decision blocks 908, 914, 920 and 922 until a "successful greater than 20 percent breakout" is detected or a "failed breakout" occurs. Each time the process proceeds through the loop, it takes the historical pricing record that the index references and performs several steps. At step 908, a check is performed to determine if the high price is at least 20 percent above the breakout price saved at step 902. If so, a flag is set for the "breakout greater than or equal to 20 percent" (boGE20pc) to true and returns at step 912. If not, the process proceeds to step 914 to determine if the close of the historical pricing record array referenced by the index is under 2.5 percent of the calculated pivot point. If so, the process then proceeds to step 916, and a "failed breakout" flag is set to true. The process then returns at step 918. If neither of the tests of decision blocks 908 and 914 are successful, the index number is incremented at step 920 to the next historical pricing record array. At step 922, the data is checked to see if additional data exists. If additional data exists, the process returns to step 908. If no additional data exists, the process proceeds to step 924. At step 924, a final check is made to determine if the breakout is "in the zone" meaning within 48 hours of breaking out, the stock is within plus 5 percent and minus 2.5 percent of the calculated pivot point. If the data is "in the zone," a flag is set at step 930 and the process proceeds to step 932 to return. If the data is not "in the zone," the process proceeds to step 926 to set the variable "breakout less than 20 percent" (boLT20pc) flag. The process then returns at step 928.

Figure 10:
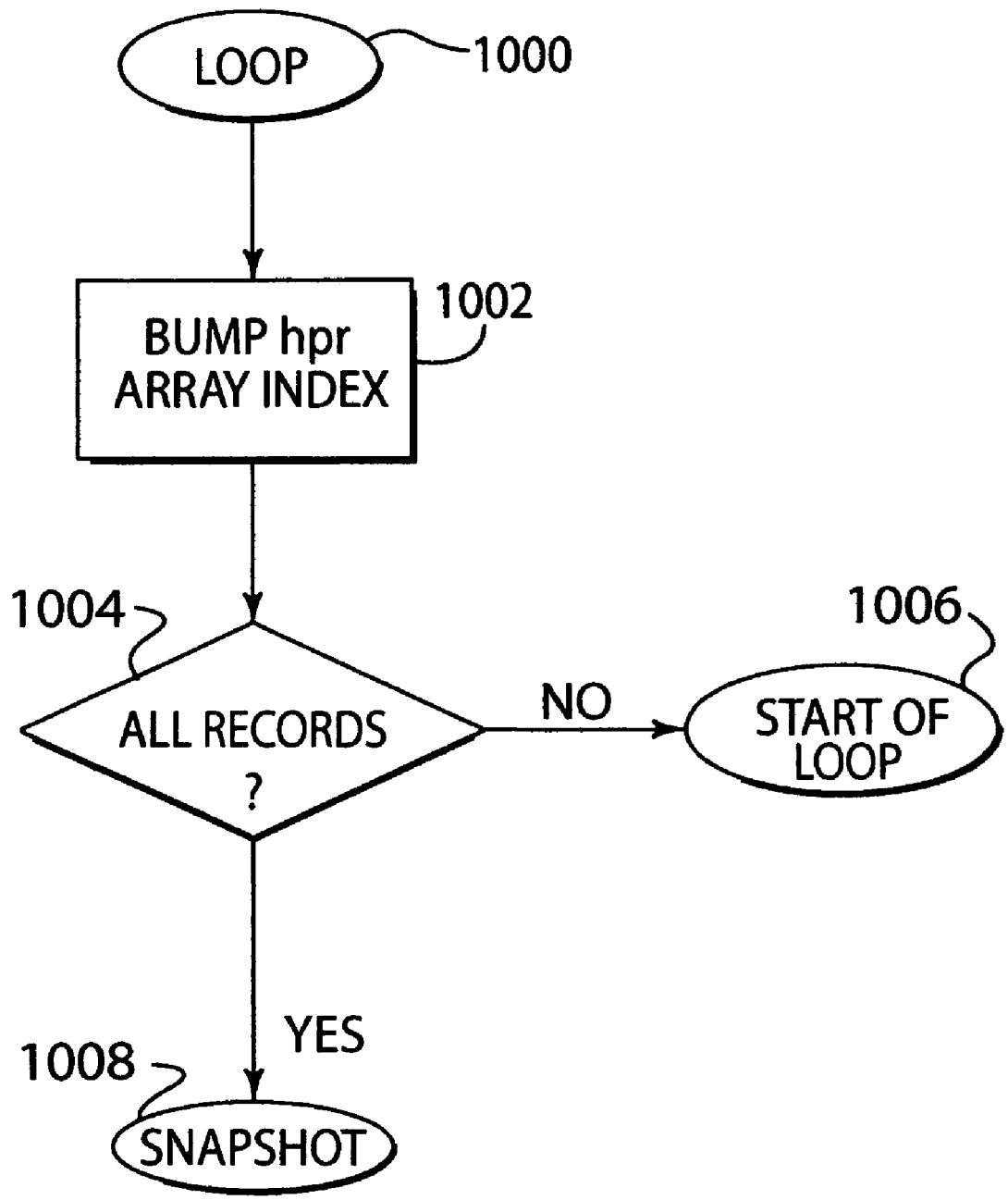
FIG. 10 is a flow diagram illustrating the process for a loop back.

FIG. 10 is a flow diagram illustrating the loopback process. Most of the processes disclosed in the various flow diagrams are executed after a single record from the historical pricing record array has been referenced. As has been shown above, the data is analyzed to determine if a top or bottom of a base has been detected, whether a base is forming, and if so, if the base is ready to breakout. The start of a handle, if any, is detected, along with the pivot point. The process also detects if the base has broken out, and what kind of breakout has occurred. The last step in both of these processes is that the next record from the historical pricing record array is referenced and the cycle repeats as a result of the loopback process disclosed in FIG. 10. The loopback process illustrated in FIG. 10 at step 1000 is entered at step 112 of FIG. 1. At step 1002, the historical pricing record array index (record pointer) is incremented by one. At step 1004, it is determined whether the index pointer has been incremented beyond the index of the list of records. In other words, it is determined if all of the records from the historical pricing record array have been examined. If there are still additional records, the process proceeds to step 1006 (step 100 of FIG. 1) to loopback through the process of FIG. 1. If all of the records have been considered, a snapshot is taken of the characteristics of the current base at step 1008.

Figure 11:
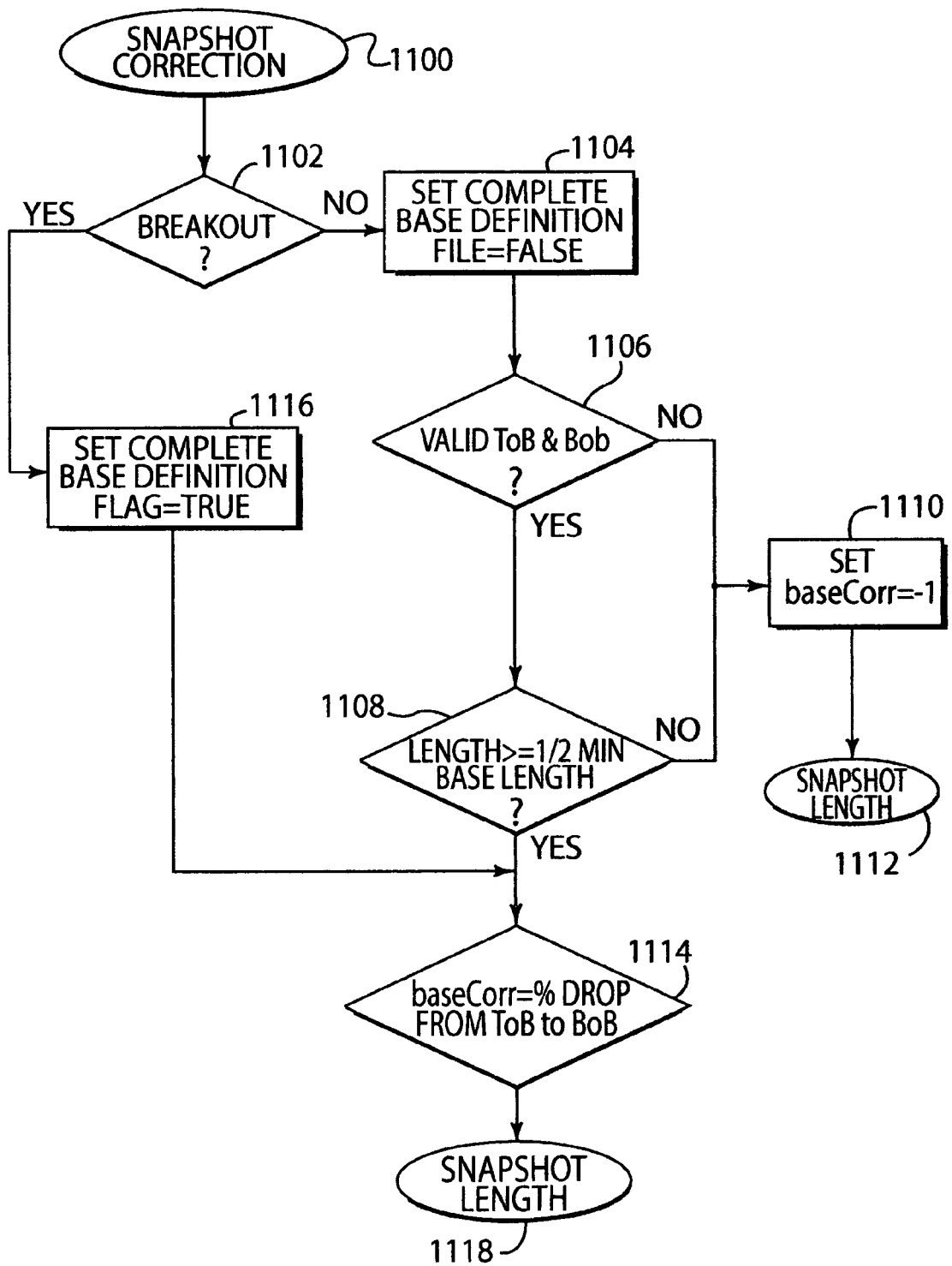
FIG. 11 is a flow diagram illustrating the process for calculating a base correction.

FIG. 11 is a flow chart disclosing a process for calculating base correction. The first snapshot calculation is the correction, or percentage dip, at the top of the base to the bottom. If the base is not yet formed, this process will set the correction to −1, indicating to the rest of the snapshot coding, that the correction is invalid. In either case, the variable "baseCorr" is set. The snapshot correction process is initiated at its step 1100. At step 1102, it is determined whether the stock broke out of its base by checking the {eBOType} (enumerated breakout type) variable that was set in the process illustrated in FIG. 9. If the breakout was successful, the "complete base definition" flag is set to true at step 1116. The process then proceeds to step 1114 where the correction is calculated by taking the percentage drop from the top of base to the bottom of base. At step 1118, the base length is then calculated. If a successful breakout is not indicated at step 1102, and all of the records from the historical pricing record array were processed, the process proceeds to step 1104 to set the "complete base definition" flag to false. The process then proceeds to step 1106 to determine if a valid top of base and a valid bottom of base have been determined by checking the values of these parameters. If either of these parameters is set to −1, they are invalid and the correction is set to −1 at step 1110. The base length is then calculated at step 1112. If it is determined at step 1106 that the top of base and bottom of base are both valid, the process proceeds to step 1108 to determine if the distance between the top of base and bottom of base is at least one half of the minimum base length, as defined by the constant "minimum base length". If it is not, the process proceeds to step 1110. If it is, the process proceeds to step 1114, as described above.

Figure 12:
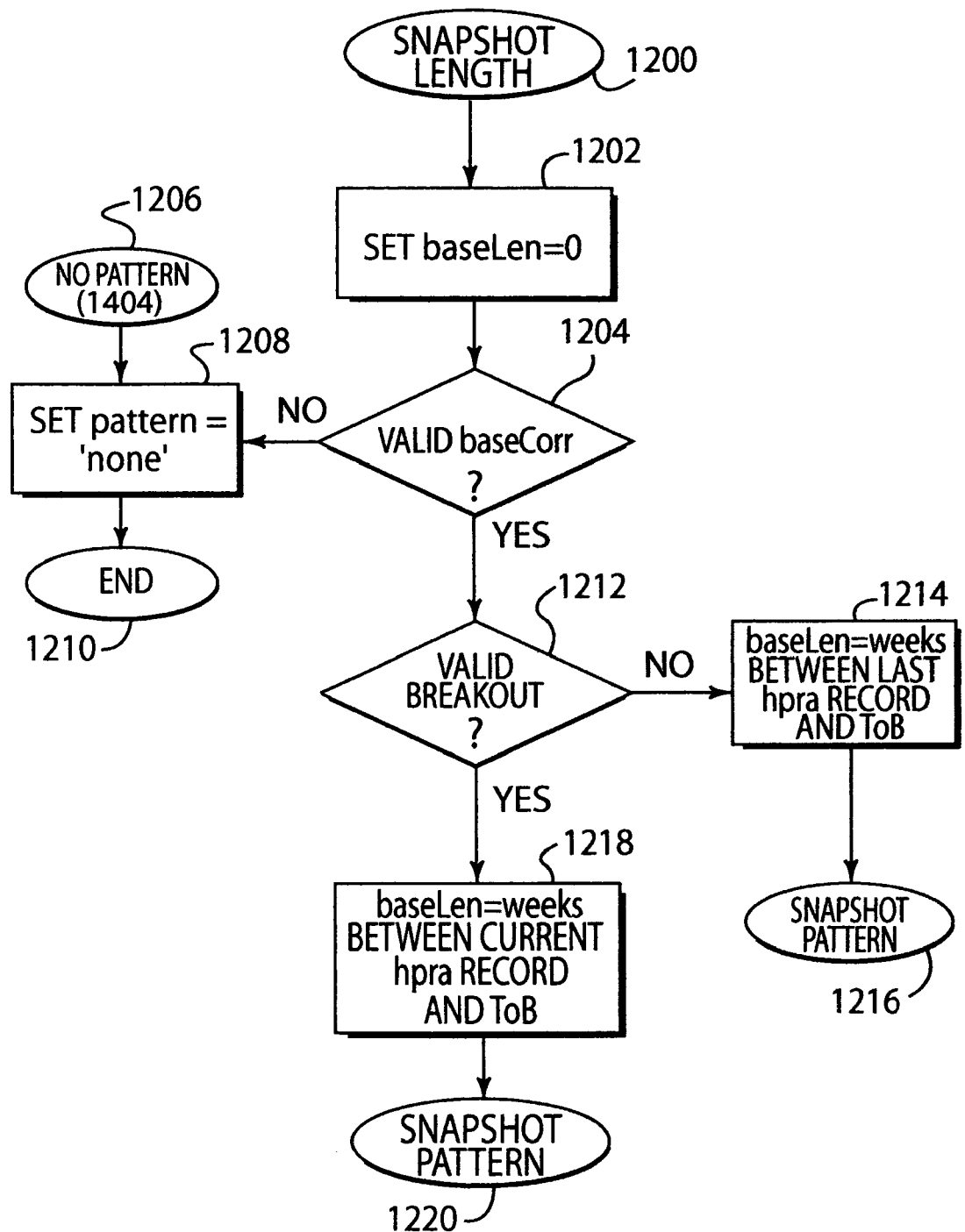
FIG. 12 is a flow diagram illustrating the process for calculating base length.

FIG. 12 is a flow chart illustrating the manner in which the base length is calculated. After the percentage correction calculation is performed in accordance with FIG. 11, the base length, in weeks, is calculated and saved as the variable "base length". The percentage base correction generated at step 1118 of FIG. 11 is input as the snapshot length at step 1200. At step 1202, the variable "base length" is set to zero. At step 1204, the variable "base correction" is checked for validity. If the variable "base correction" is invalid, e.g., is set to −1, the enumerated pattern variable {ePtn} is set to the enumerated value "none" at step 1208, indicating that no pattern has been formed. Also, when it is determined at step 1404 (FIG. 14) that there is no pattern, reference 1206 comprises the input in FIG. 12 for step 1404 of FIG. 14. The application then ends at step 1210.

If it is determined at step 1204 that the "base correction" is valid, the process proceeds to step 1212 to determine if the base had a valid breakout. If there was a valid breakout, the process proceeds to step 1218 to calculate the base length by computing the number of weeks between the date of the top of base and the breakout date. The process then proceeds to step 1220 to determine the base pattern. If it is determined at step 1212 that there was not a valid breakout, the process proceeds to step 1214 and the base length is calculated by computing the number of weeks between the date of the top of base and the date from the last record analyzed in the historical pricing record array. The process then proceeds to step 1216 to determine the base pattern.

Figure 13:
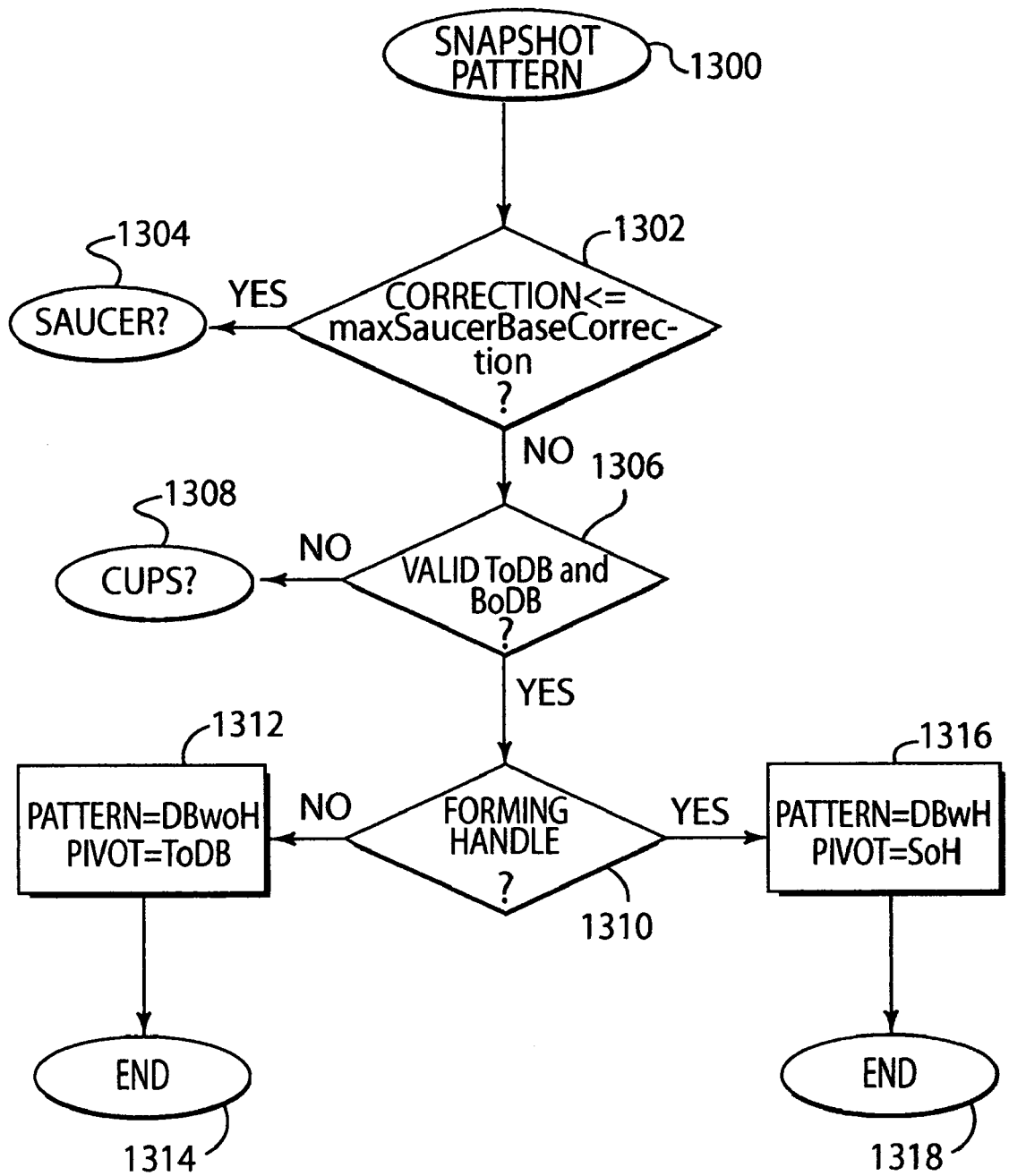
FIG. 13 is a flow diagram illustrating the process for checking a base pattern for a double bottom formation.

FIG. 13 is a flow diagram illustrating the manner of determining a double bottom formation. After the base correction and length have been calculated, the next step is to determine the base pattern. The snapshot pattern at steps 1220 and 1216 of FIG. 12 constitutes the input 1300 of FIG. 13. At step 1302, the calculated correction is checked to determine if it is less than the constant "maximum saucer base correction". The constant "maximum saucer base correction" is a maximum value for a saucer based pattern which is set in Table 1 during the setup and initialization phase. If the correction is less than or equal to this constant value set in Table 1, the process proceeds to step 1304 to determine the saucer pattern base pivot information disclosed in FIG. 14. If the correction is greater, the process proceeds to step 1306. At step 1306, the variables "top of double bottom" and "bottom of double bottom" are checked to see if they are valid, e.g., these variables are checked to see if they are set at −1. If either one is not valid, the process proceeds to step 1308 to the cup pattern calculation of FIG. 15. If both the top of the double bottom and the bottom of double bottom values are valid, the process proceeds to step 1310 to determine if a valid handle exists. At step 1310, the variable [iSoH] is checked. If this variable is valid, then the enumerated pattern [ePtn] variable is set to double bottom with handle [DBwH], and the pivot is set to the start of handle [SoH] value at step 1316. The process then ends at step 1318. If the handle found to be invalid at step 1310, the process proceeds to step 1312. At step 1312, the pattern variable [ePtn] is set to "double bottom without handle" [DbwoH]. Additionally, the pivot is set to the value of the top of double bottom [ToDB]. The process then is completed at step 1314.

Figure 14:
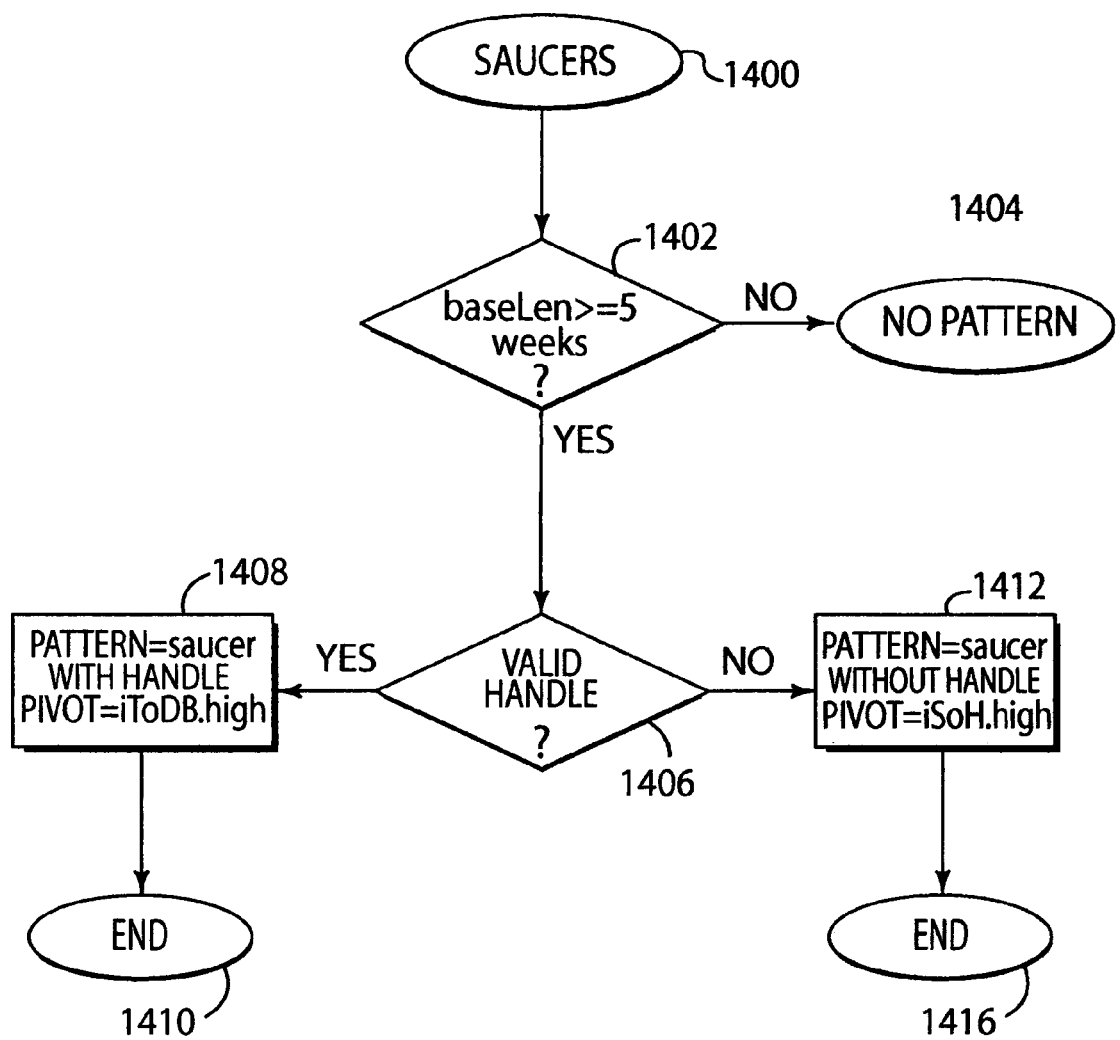
FIG. 14 is a flow diagram illustrating the process for determining the existence of a saucer wave pattern.

FIG. 14 is a flow diagram that calculates saucer patterns. At step 1304 of FIG. 13, the calculated base correction indicated that the base may be a saucer pattern. The process of FIG. 14 determines if a saucer pattern exists by checking the base length. Step 1304 comprises the input 1400 of FIG. 14. At step 1402, the length of the base is checked to validate that the base is at least 5 weeks long. If it is not, the process proceeds to 1404 which comprises the input 1206 of FIG. 12. If the base length is at least 5 weeks, the process proceeds to step 1406 to determine if there is a valid handle. If there is a valid handle, the process proceeds to 1408. At step 1408, the pattern is set to saucer with handle [ePtn=SwH], and the pivot value is set to the index value of the high value of the top of base. The process then ends at step 1410. If there is no handle indicated, the pattern is set to saucer without handle [ePtn=SwoH] and the pivot is set to iSoH.high at step 1412. The process then ends at step 1416.

Figure 15:
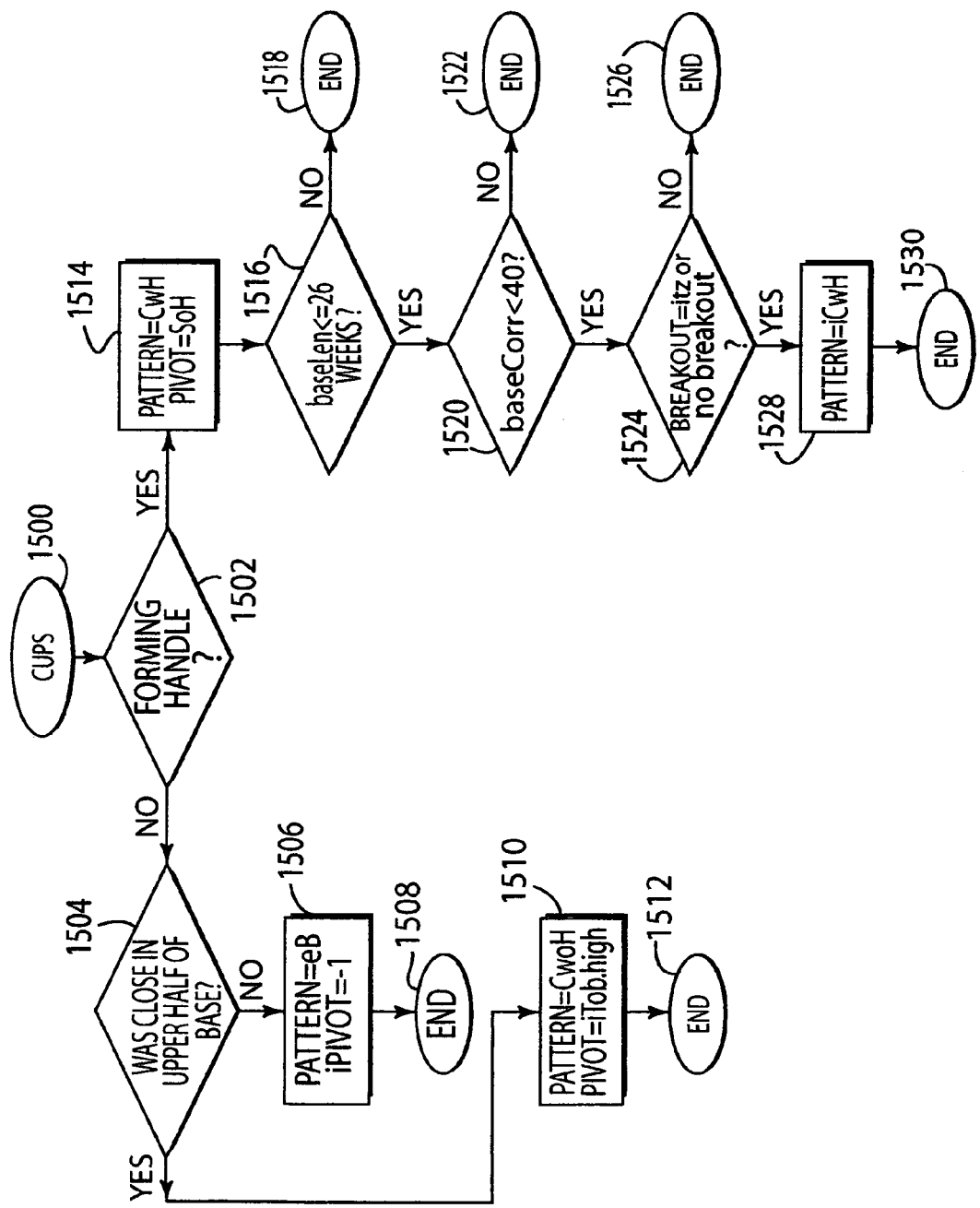
FIG. 15 is a flow diagram illustrating the process for determining the existence of a cup pattern.

FIG. 15 is a flow diagram for calculating a cup pattern. Cups are common and important patterns. At step 1308 of FIG. 13, it was determined that a cup pattern was forming. Step 1308 constitutes the input to step 1500 of FIG. 15. The process of FIG. 15 is entered into after determining that the correction (change in stock value) is larger than that for saucers. At step 1502, a check is made to see if a handle is forming. This is done by checking the number of trading days since the start of handle (iSoH). The number of trading days must be at least three days. The closing price is then checked to determine if it is less than the closing price when the handle started (iSoH). If both of these checks are true, then a flag is set indicating that a handle is started. If it is determined at step 1502 that a handle is not forming, the process proceeds to step 1504 to determine if the closing price from the last record of the historical pricing record array is in the upper half of the base. If the closing price was below the midpoint, the pattern (ePtn variable) is set to etching base (eB) at step 1506. Also, at step 1506, the pivot is set to −1 indicating an invalid pivot. The process then ends at step 1508. If it is determined at step 1504 that the closing price is above the midpoint, the process proceeds to step 1510. At step 1510, the pattern (ePtn variable) is set to cup without handle (CwoH). At step 1510, the pivot is also set to the high value of the top of base value. The process then ends at step 1512. If it is determined at step 1502 that a handle is forming, the process proceeds to step 1514. At step 1514, the pattern variable (ePtn variable) is set to cup without handle (CwoH). At step 1514, the pivot is set to the start of handle value (SoH). The process then proceeds to step 1516 to check the base length. If the base length is less than or equal to 26 weeks, the process ends at step 1518. If the base length is greater than 26 weeks, the process proceeds to 1520 to determine the percentage value of the base correction (the percentage change in the value of the stock). If the base correction (baseCorr) is less than 40 percent, the process ends at step 1522. If it is greater than 40 percent, the process proceeds to step 1524 to check the type of breakout. If the type of breakout was either "in the zone" (boITZ) or there was no breakout, the process ends at step 1526. If either of these is true, the process proceeds to step 1528 to set the pattern as a cup with handle. At step 1528, the pattern is set to ideal cup with handle (iCwH), and the process ends at step 1530.

As disclosed above, the software loops through each data record for each stock and then stores the results and the analysis for each stock in a set of tables within a database. This stored data, including the analysis data, that is stored in tables in the database can then be used to create a spreadsheet illustrating the results of the data and an annotated chart showing not only the open, high, low, close and volume data points for some period of time, for example a year, but can also show annotation "balloons" that illustrate the top and bottom of the base, the start of a handle, the correction, etc. The software repeats this process for thousands of stocks each day as soon as the daily updated open, high, low, close and volume data are made available from the data source. The tables of data that are stored in the database can then be queried by a user using various sorting techniques that can be used for sorting tables in the database. For example, a user can query a request "show me all cups with handle that have a correction of between 25% and 35% that are at least 15 weeks long." This data can then be displayed in a spreadsheet format or as an annotated chart as disclosed above. The data can also be queried to determine the overall state of the market. For example, a query can be made as to how many stocks have formed a cup with handle pattern over the past 30 days or other selected time period, and then had a successful breakout. A query can be made as to how many of these have had a failed to breakout. The trend of these numbers can provide a market indicator as to overall market optimism or pessimism. Market optimism and pessimism is a valuable future indicator of whether to buy or sell stocks and is not normally discernable from most market analysis techniques.

Figure 16:
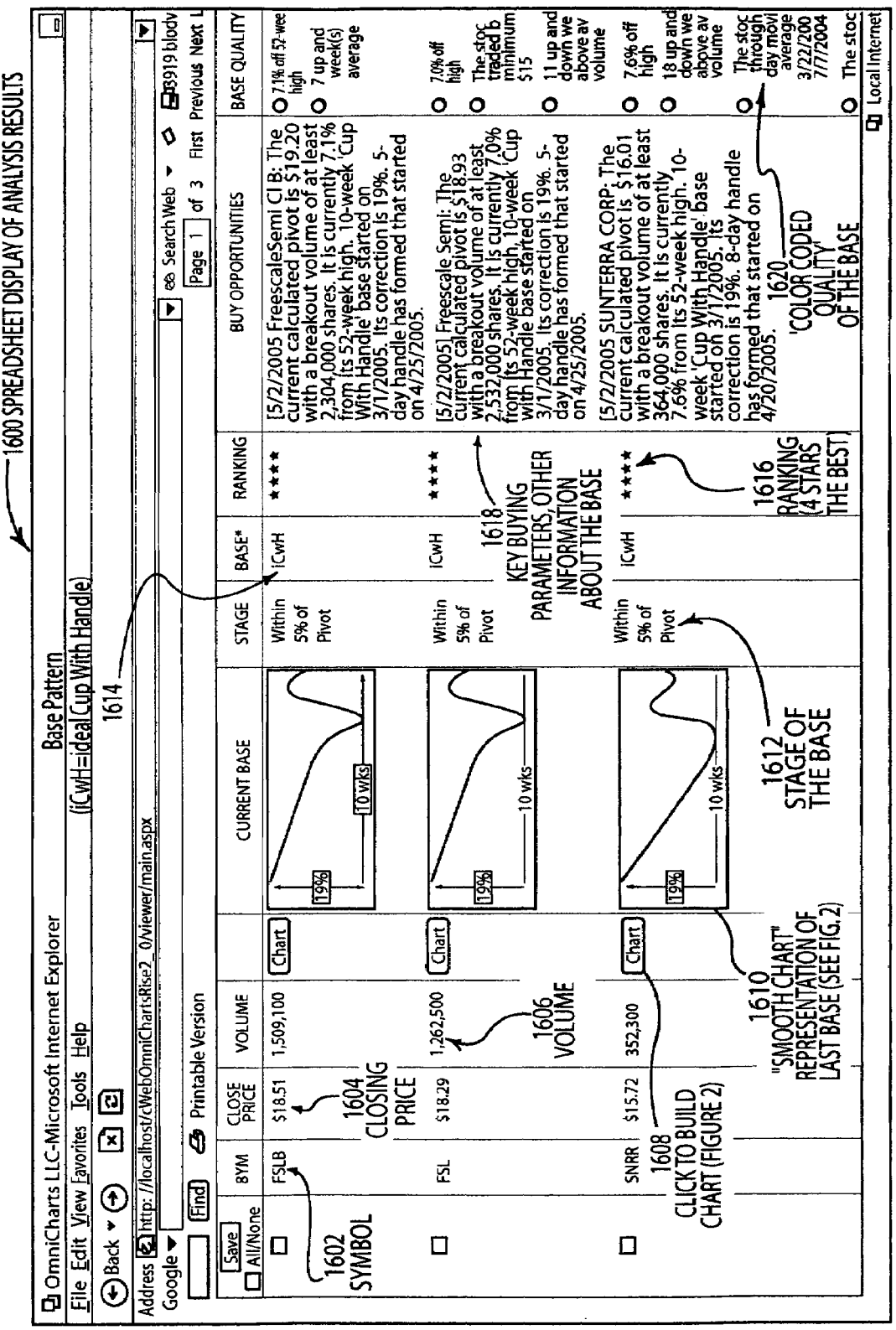
FIG. 16 is an illustration of a spreadsheet that displays the results of the analysis of stock waveforms.
Figure 17:
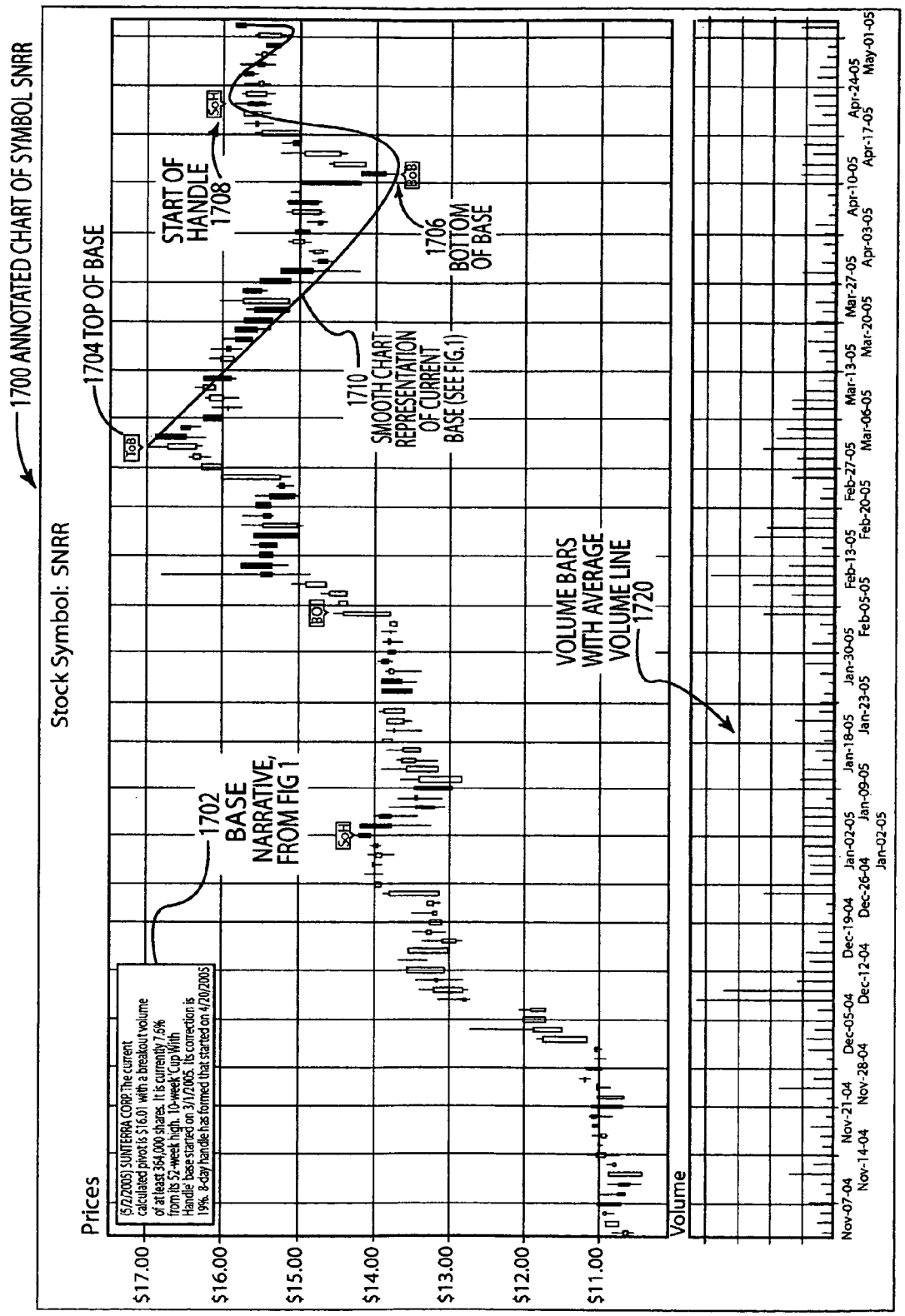
FIG. 17 is an illustration of an annotated waveform.

FIGS. 16 and 17 show the manner in which the results of the analysis can be displayed on either a spreadsheet or as an annotated waveform for the stock. FIG. 16 shows a typical spreadsheet 1600 that can be used to display the results of the analysis performed by the various processes disclosed above. As shown in FIG. 16, the "symbol" column provides symbols, such as symbol 1602, that are used by the stock exchange to identify the stock. The "closing price" column indicates a closing price such as closing price 16.04 for the stock symbol FSLB. The "volume" column provides a volume number, such as volume 1606, on the day listed in the buying opportunities column. Volume is the number of stocks sold on the current day in which this information is accessed. The "chart button" 1608 is a button which can be activated by a cursor which will build the annotated charts, such as shown in FIG. 17. The "current base" column provides a "smooth chart" that illustrates the most current base of the stock. A larger representation is shown in FIG. 17. The "stage" column shows the most current stage of the base. For example, the current stage may be "ready to breakout", "has already broken out", "forming a base", etc. Item 1612 indicates that for stock symbol SNRR that the stock is within 5 percent of the calculated pivot. The "base" column indicates the calculated pattern of the base. For example, for stock symbol FSLB, the pattern illustrated at item 1614 is an "ideal cup with handle." Other patterns include "flat base", "double bottom with handle", etc. The "ranking" column provides the overall ranking of a stock in terms of its potential for a successful breakout. As shown on this chart, the best ranking is four stars. Item 1616 shows the ranking of stock symbol SNRR as four stars. Item 1618 are the key buying parameters and other information about the base for stock symbol FSL on the date May 2, 2005. For example, the "buying opportunities" column lists the key buying parameters, such as the calculated pivot point and breakout volume, as well as other relevant information that helps gauge the strength or weakness of an opportunity to either buy or sell. This information can include the type of base, the length of the base, the amount of correction and other information that is calculated using the processes disclosed above. The "base quality" column provides the overall quality of the base and can be color coded. For example, positive can be green, cautionary can be yellow and concern can be red. Item 1620 indicates that stock symbol SNRR provides certain cautionary information about the stock.

FIG. 17 is an illustration of an annotated chart for stock symbol SNRR. The chart illustrated in FIG. 17 results from clicking on the chart button 1608 illustrated in FIG. 16. FIG. 17 is an annotated chart that provides the daily price and volume of the stock symbol SNRR. Item 1702 is a narrative which gives a summary of information relating to the current base which is indicated as item 1710 in FIG. 17. Item 1704 is a top of base annotation that is automatically generated and indicates the location of the top of base. The location of the top of base is calculated in the manner described above. Item 1704 illustrates the bottom of base which is an annotation that is automatically generated on the annotated chart illustrated in FIG. 17. Again, the bottom of base is calculated in accordance with the procedures described above. Item 1708 is a annotation illustrating the location of the start of a handle. The start of handle annotation is also automatically generated as part of the annotated chart illustrated in FIG. 17 and is calculated in the manner described above. Item 1710 is an illustration of a smooth chart representation of the current base that is also automatically generated in the annotated chart. Item 1720 is a graph of the daily volume and average volume of the stock. Hence, the annotated chart illustrated in FIG. 17 provides valuable information in a visual format that assists an investor in making decisions.

Hence, the embodiments disclosed provide a unique way of analyzing stock waveforms and providing data regarding patterns that have formed with respect to the waveforms. These waveforms can then be used to make decisions regarding the purchase or sale of a stock by an investor.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of analyzing a waveform of a stock to detect predetermined patterns in said waveform using a computer system comprising:
    providing a data record array to said computer system that includes price and volume data of said stock;
    providing constants to said computer system relating to a definition of said specified predetermined patterns;
    analyzing said data record array in said computer system to determine if a base has formed that has a top of base value and a bottom of base value that are separated by a specified amount and a temporal length greater than a minimum base length;
    analyzing said data record array in said computer system to determine the existence of specified said predetermined patterns in said base;
    analyzing said data record array in said computer system to determine the existence of specified said predetermined patterns that are attached to said base;
    displaying said predetermined patterns in said base and said predetermined patterns attached to said base.

2. The method of claim 1 wherein the process of analyzing said data record array in said computer system to determine if a base has formed further comprises:
    analyzing said data record array in said computer system to determine a magnitude and temporal value for a top of base;
    analyzing said data record array in said computer system to determine a magnitude and temporal value for a bottom of base;
    comparing said magnitude of said top of base and said magnitude of said bottom of base in said computer system to generate a magnitude difference value between said magnitude of said top of base and said magnitude of said bottom of base;
    comparing said temporal value for said top of base with said temporal value for said bottom of base in said computer system to generate a temporal difference value:
    obtaining constants comprising a minimum base length and a maximum percentage base correction;
    determining that a base exists whenever said magnitude difference value is less than said maximum percentage base correction and said temporal difference value is greater than said minimum base length.

3. The method of claim 2 further comprising:
    analyzing said data record array using said computer system to determine if said base is ready to breakout by determining if a current index has a value that is greater than a midpoint between said top of base and said bottom of base;
    determining a temporal value for said breakout using said computer comparing said temporal value of said top of base and said temporal value of said breakout using said computer system to generate a breakout temporal difference value;
    determining if said breakout temporal difference value is within a predetermined range to determine if a breakout has occurred using said computer system.

4. The method of claim 3 wherein the process of providing constants to said computer system further comprises:
    providing a constant relating to a maximum percentage correction for a saucer base correction.

5. The method of claim 4 wherein said process of analyzing said data record array in said computer system to determine if a base has formed further comprises:
    analyzing said data record array in said computer system to determine if a double bottom pattern exists.

6. The method of claim 4 wherein the process of analyzing said data record array in said computer system to determine the existence of specified said predetermined patterns in said base further comprises:
    determining the existence of a saucer pattern by comparing said maximum percentage correction for a saucer base correction with said top of base value and said bottom of base value using said computer system, and by comparing said temporal length of said base with said minimum base length using said computer system.

7. The method of claim 4 wherein the process of analyzing said data record array in said computer system to determine the existence of specified said predetermined patterns in said base further comprises:
    determining the existence of a cup pattern by comparing said maximum percentage correction for a saucer base correction with said top of base value and said bottom of base value, and by comparing said temporal length of said base with said minimum base length;
    determining that double bottoms do not exist in said base.

8. The method of claim 1 further comprising:
    comparing a high value of said price of said stock to a value that is half of the difference between said top of base value and said bottom of base value using said computer system;
    indicating that a-said stock is ready to breakout whenever said high value is greater than said value that is half said difference using said computer system;
    calculating a pivot point using said computer system;
    comparing said high value price to said pivot point using said computer system;
    comparing selling volume to a percentage of volume that is greater than an average selling volume to determine if a breakout has occurred using said computer system.

9. The method of claim 8 wherein the process of analyzing said data record array in said computer system to determine the existence of specified said predetermined patterns that are attached to said base further comprises: receiving an indication that a breakout has occurred; comparing subsequent price values with a pivot value;

indicating that a handle is forming when said subsequent price values are less than said pivot value.

10. The method of claim 1 wherein said process of displaying said predetermined patterns comprises:

displaying said predetermined patterns on a spreadsheet.

11. The method of claim 1 wherein said process of displaying said predetermined patterns comprises:

displaying said predetermined patterns as annotated waveforms.

12. A computer system that is programmed to perform a method of analyzing a waveform of a stock to detect predetermined patterns comprising:

providing a data record array to said computer system that includes price and volume data of said stock;

providing constants to said computer system relating to a definition of said predetermined patterns;

analyzing said data record array in said computer system using said constants to determine if a base has formed that has a top of base value and a bottom of base value that are separated by a specified amount and a temporal length greater than said minimum base length;

analyzing said data record array in said computer system to determine the existence of specified said predetermined patterns in said base;

analyzing said data record array in said computer system to determine the existence of specified said predetermined patterns that are attached to said base;

displaying said specified predetermined patterns in said base and said specified predetermined patterns attached to said base.

13. A computer readable medium that can be used to program a computer system to perform a method of analyzing a waveform of a stock to detect specified predetermined patterns comprising:

providing a data record array to said computer system that includes price and volume data of said stock;

providing constants to said computer system relating to a definition of said specified predetermined patterns comprising a minimum base length and maximum percentage base correction;

analyzing said data record array in said computer system using said constants to determine if a base has formed that has a top of base value and a bottom of base value that are separated by a specified amount and a temporal length greater than said minimum base length;

analyzing said data record array in said computer system to determine the existence of specified said predetermined patterns in said base;

analyzing said data record array in said computer system to determine the existence said predetermined patterns that are attached to said base;

displaying said predetermined patterns in said base and said predetermined patterns attached to said base.

14. A method of analyzing a waveform of a stock to detect specified predetermined patterns in said waveform using a computer system comprising:

providing a data record array to said computer system that includes price and volume data of said stock;

providing constants to said computer system relating to a definition of said predetermined patterns comprising a minimum base length and maximum percentage base correction;

analyzing said data record array in said computer system using said constants to determine if a base has formed that has a top of base value and a bottom of base value that are separated by a specified amount that is less than said maximum percentage base correction and a temporal length greater than said minimum base length;

analyzing said data record array in said computer system to determine the existence of specified said predetermined patterns in said base;

analyzing said data record array in said computer system to determine the existence of specified said predetermined patterns that are attached to said base;

displaying said specified predetermined patterns in said base and said predetermined patterns attached to said base.

\* \* \* \* \*